United States Patent
Kanebako et al.

(10) Patent No.: US 6,635,976 B2
(45) Date of Patent: Oct. 21, 2003

(54) MAGNETIC LEVITATION MOTOR AND METHOD FOR MANUFACTURING THE SAME

(75) Inventors: Hideki Kanebako, Nagano (JP); Yohji Okada, Ibaraki (JP)

(73) Assignee: Sankyo Seiki Mfg. Co., Ltd., Nagano-ken (JP)

( * ) Notice: Subject to any disclaimer, the term of this patent is extended or adjusted under 35 U.S.C. 154(b) by 0 days.

(21) Appl. No.: 09/750,512

(22) Filed: Dec. 28, 2000

(65) Prior Publication Data

US 2001/0013734 A1 Aug. 16, 2001

(30) Foreign Application Priority Data

Jan. 5, 2000 (JP) ........................... 2000-000388
Jan. 5, 2000 (JP) ........................... 2000-000385

(51) Int. Cl.[7] ................................. H02K 7/09
(52) U.S. Cl. ..................................... 310/90.5
(58) Field of Search ................ 310/90.5; H02K 7/09

(56) References Cited

U.S. PATENT DOCUMENTS 4,683,391 A * 7/1987 Higuchi .................... 310/49 R
5,208,522 A   5/1993 Griepentrog et al. ....... 318/611
5,783,886 A * 7/1998 Hong ........................ 310/90.5

FOREIGN PATENT DOCUMENTS

| DE | 35 23 344 |   | 1/1987 |            |
|----|-----------|---|--------|------------|
| DE | 197 33 239|   | 2/1999 |            |
| JP | 06141512  | * | 5/1994 | ........... H02K/7/09 |

* cited by examiner

Primary Examiner—Nestor Ramirez
Assistant Examiner—Hanh Nguyen
(74) Attorney, Agent, or Firm—Hogan & Hartson, LLP

(57) ABSTRACT

A magnetic levitation motor has a rotator body formed from a magnetic member and having segmented permanent magnets attached to a peripheral surface thereof. Two magnetic levitation motor sections are disposed in an axial direction of the rotator body. Each of the magnetic levitation motor sections having a first stator winding that generates a levitation control magnetic flux for levitating the rotator body and a second stator winding that generates a rotation magnetic flux for rotating the rotator body. The segmented permanent magnets are affixed to the rotator body at the two magnetic levitation motor sections with magnetic polarities thereof mutually opposite to each other. The segmented permanent magnets function as bias magnets that generate a direct-current magnetic flux that radially spreads from within the rotor.

7 Claims, 11 Drawing Sheets

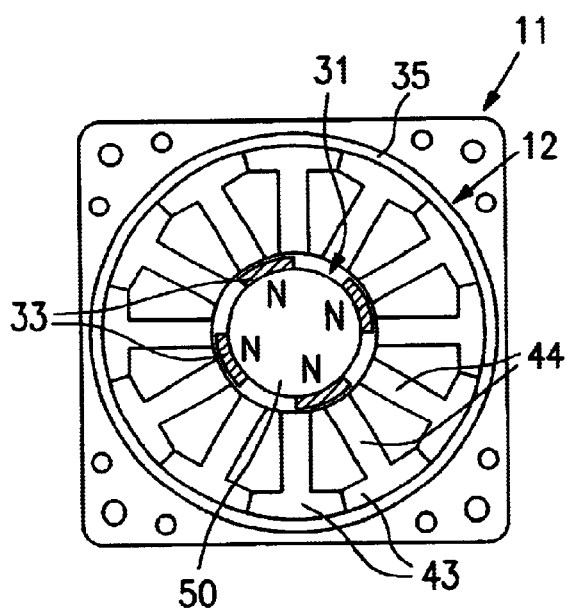 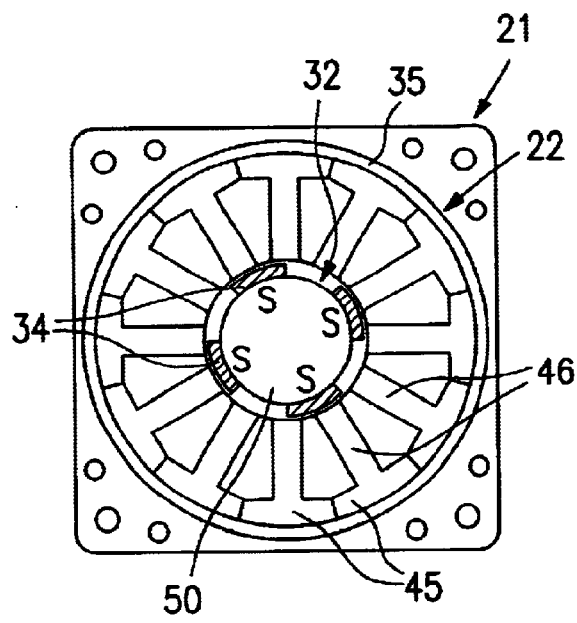
FIG. 2(a)   FIG. 2(b)
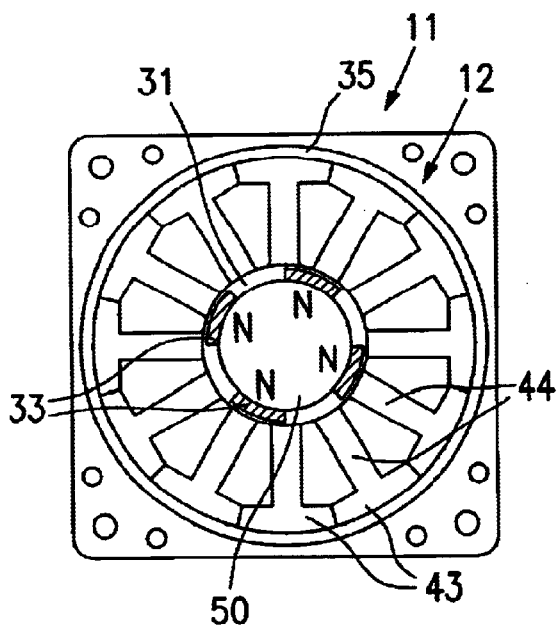 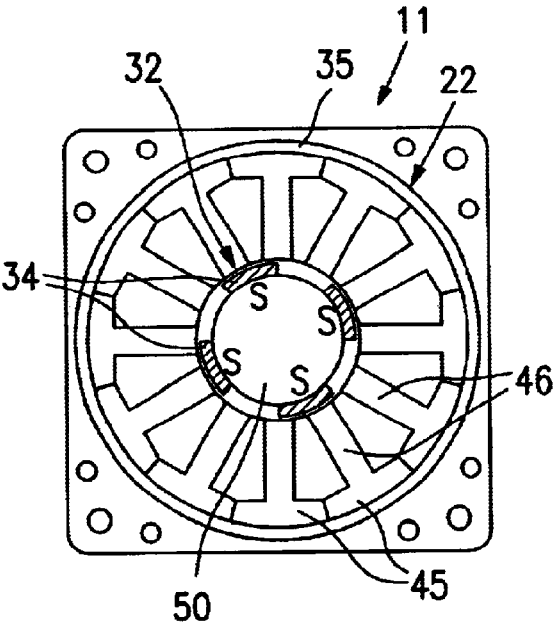
FIG. 3(a)   FIG. 3(b)

MAGNETIC LEVITATION MOTOR AND METHOD FOR MANUFACTURING THE SAME

BACKGROUND OF THE INVENTION

1. Field of the Invention

The present invention relates to a magnetic levitation motor having a stator winding for controllably levitating a rotor and another stator winding for generating a rotation magnetic flux and a method for manufacturing the same.

2. Description of Related Art

Contact-type bearings are widely used. In addition, non-contact type magnetic bearings are also gaining popularity. A typical magnetic bearing uses a magnetic force to levitate a rotor member such as a rotor shaft and supports the rotor member in a non-contact manner. By the use of the magnetic bearing, the coefficient of friction of the bearing section becomes substantially zero (0), which makes a high-speed rotation possible. Also, the magnetic bearing does not need lubrication oil. This allows the use of the magnetic bearing under special conditions. For example, the magnetic bearing can be used at a high temperature or a low temperature, in vacuum and the like. Furthermore, no maintenance work is required. Accordingly, magnetic bearings are used to support rotors in motors.

A motor with magnetic bearing basically has a structure in which a magnetic bearing, a motor section that is a system for generating a rotation force and a magnetic bearing are disposed in this order in an axial direction of a rotor shaft. However, in this structure, the magnetic bearings are disposed on both sides of the motor section, and therefore the length of the rotor shaft increases, and the critical speed lowers.

In view of the fact that the stator of a magnetic bearing has a structure substantially similar to that of a stator of an AC motor, magnetic levitation motors in which magnetic bearings and a motor are formed in one piece have been proposed. One type of magnetic levitation motor is a hybrid magnetic levitation motor. The hybrid magnetic levitation motor uses a permanent magnet to form a constant magnetic flux that radially spreads from within a rotor, so that the rotor is controllably levitated by two-pole direct current magnetic fields, in a similar manner as a typical magnetic bearing. The hybrid magnetic levitation motor can form a constant magnetic flux by the permanent magnet, and therefore can generate a bias attraction force without consuming electric power, which provides an advantage in that an electromagnet used therein can take charge of only the controlling force.

However, in the hybrid magnetic levitation motor described above, relatively large permanent magnets are required to form a constant magnetic flux that radially spreads from within the rotor, in addition to driving permanent magnets for rotating the rotor. This leads to various problems. For example, the number of assembly steps increases, the size reduction of the motors becomes difficult, the manufacturing cost increases and the motors are restricted to a limited number of structures.

Another type of magnetic levitation motor is described in Japanese Laid-open patent application HEI 7-184345. The magnetic levitation motor described in this reference has a magnetic levitation motor section on one side of a shaft member and a magnetic bearing on the other side of the shaft member. However, the magnetic levitation motor described in this reference is difficult to generate a large output appropriate for the overall size of the magnetic levitation motor.

Furthermore, the conventional hybrid magnetic levitation motor is a hybrid of a radial magnetic bearing and a motor. An independent thrust bearing that functions only as a magnetic levitation thrust bearing is added to the hybrid magnetic levitation motor.

On the other hand, compound magnetic bearings that have specially designed magnetic paths are proposed. A typical compound magnetic bearing is formed from a combination of a radial magnetic bearing and a thrust magnetic bearing.

As described above, a conventional magnetic levitation motor is formed from a combination of a radial magnetic bearing and a motor integrally formed in one piece. An independent thrust magnetic bearing that functions only as a thrust bearing is added to such a conventional magnetic levitation motor. The thrust magnetic bearing occupies a substantially large portion of the overall structure of the motor, and therefore is a hindrance to the size reduction of the magnetic levitation motors.

Also, when a compound magnetic bearing formed from a combination of a radial magnetic bearing and a thrust magnetic bearing is employed, an independent motor is additionally required. This also prevents size reduction of the magnetic levitation motors.

SUMMARY OF THE INVENTION

It is an object of the present invention to solve the problems of the conventional technology described above. It is also an object of the present invention to provide a magnetic levitation motor having specially designed permanent magnets for generating a bias magnetic flux, which reduces the number of assembly steps, reduces the size of the motor, lowers the manufacturing cost, and improve the degree of freedom in designing the motor structure.

It is also an object of the present invention to provide a magnetic levitation motor that uses a bias magnetic flux of a hybrid magnetic levitation motor, in which a thrust bearing is disposed in a magnetic path of the bias magnetic flux. As a result, a smaller magnetic levitation motor having a compound system of a magnetic levitation motor and a thrust magnetic bearing can be provided.

In accordance with an embodiment of the present invention, a magnetic levitation motor has a rotator body formed from a magnetic member and having segmented permanent magnets attached to a peripheral surface thereof. Two magnetic levitation motor sections are disposed in an axial direction of the rotator body. Each of the magnetic levitation motor sections having a first stator winding that generates a levitation control magnetic flux for levitating the rotator body and a second stator winding that generates a rotation magnetic flux for rotating the rotator body. The segmented permanent magnets are affixed to the rotator body at the two magnetic levitation motor sections with magnetic polarities thereof mutually opposite to each other. The segmented permanent magnets function as bias magnets that generate a direct-current magnetic flux that radially spreads from within the rotor.

As a result, the segmented permanent magnets function as permanent magnets for generating a rotation force and magnets for generating a levitation force. Accordingly, the structure is simplified and reduced in size and the cost is reduced.

In one aspect of the embodiment of the present invention, the two rotors forming the two magnetic levitation motor sections are respectively formed from the segmented permanent magnets. The segmented permanent magnets are mounted on a common rotation member of a magnetic material at different locations in an axial direction of the common rotation member. Furthermore, the two magnetic levitation motor sections includes two stator cores that have an identical structure. A first stator winding and a second stator winding are wound around each of the two stator cores. As a result, the motor output can be increased, and the levitation force that is well balanced in the axial direction is obtained.

In one aspect of the embodiment of the present invention, surfaces of the segmented permanent magnets facing one of the stator cores have an N-pole and surfaces of the segmented permanent magnets facing the other of the stator cores have an S-pole. As a result, the segmented permanent magnets can function as both of permanent magnets for generating a rotation force and permanent magnets for generating a levitation force. As a consequence, the structure is simplified.

In one aspect of the embodiment of the present invention, opposing surfaces of the segmented permanent magnets that face the stator cores have an arc shape to make a gap magnetic flux density to have generally a sine waveform. As a result, mutual interference between the levitation force and the rotation force can be reduced, and the levitation force and the rotation force can be efficiently obtained.

Also, in one aspect of the embodiment of the present invention, the magnetic levitation motor has detecting sections that are integrally mounted on the common rotation member at locations that interpose the two magnetic levitation motor sections, and gap sensors opposing to the detecting sections. A current to the first stator winding for generating a levitation force is controlled such that gaps between the gape sensors and the detection sections detected by the gap sensors are constant. As a result, the common rotation member and the rotating parts including the rotor can be supported in a non-contact manner.

Furthermore, in accordance with another embodiment of the present invention, a magnetic levitation motor has a rotor with a permanent magnet affixed to a peripheral surface thereof, and a stator core section with a first stator winding that generates a levitation control magnetic flux for controllably levitate the rotor and a second stator winding that generates a rotation magnetic field for the rotor. A rotor-side thrust bearing magnetic path section is formed on the rotor, and two stator-side thrust bearing magnetic path sections are formed in a manner to interpose the rotor-side thrust bearing magnetic path section, such that a bias magnetic flux for forming the levitation control magnetic flux passes gaps formed in a thrust direction between the rotor-side thrust bearing magnetic path section and the two stator-side thrust bearing magnetic path sections. A thrust control coil is provided between the two stator-side thrust bearing magnetic path sections. Current is controllably conducted through the thrust control coil to support a thrust bearing load.

With the structure described above, the thrust magnetic bearing can also be incorporated as a compound structure and can be reduced in size. As a result, the length of the shaft can be shortened, and a higher rotation speed can be obtained.

In one aspect of the embodiment of the present invention, the stator core section is formed from two stator core sub-sections arranged in the axial direction, and the rotor-side thrust bearing magnetic path section and the two stator-side thrust bearing magnetic path sections are formed between the two stator core sub-sections.

As a result, in effect, two motor sections are provided in the motor, and thrust loads of the two motor sections are supported by one thrust magnetic bearing. As a consequence, there is provided a relatively compact magnetic levitation motor with a thrust magnetic bearing, which can generate a large output in spite of its compactness.

Also, in one aspect of the embodiment of the present invention, segmented rotor magnets for generating a rotation torque are disposed on the rotor opposite to the stator core section, wherein the segmented rotor magnets also function as bias magnets for generating a bias magnetic flux.

Other features and advantages of the invention will be apparent from the following detailed description, taken in conjunction with the accompanying drawings that illustrate, by way of example, various features of embodiments of the invention.

BRIEF DESCRIPTON OF THE DRAWINGS

FIG. 2(a) shows a transverse cross section of a magnetic levitation motor section on one side of a magnetic levitation motor, and FIG. 2(b) shows a transverse cross section of a magnetic levitation motor section on the other side.

FIG. 3(a) shows a transverse cross section of a magnetic levitation motor section on one side of a magnetic levitation motor in accordance with another embodiment of the present invention, and FIG. 3(b) shows a transverse cross section of a magnetic levitation motor section on the other side.

Figure 13:
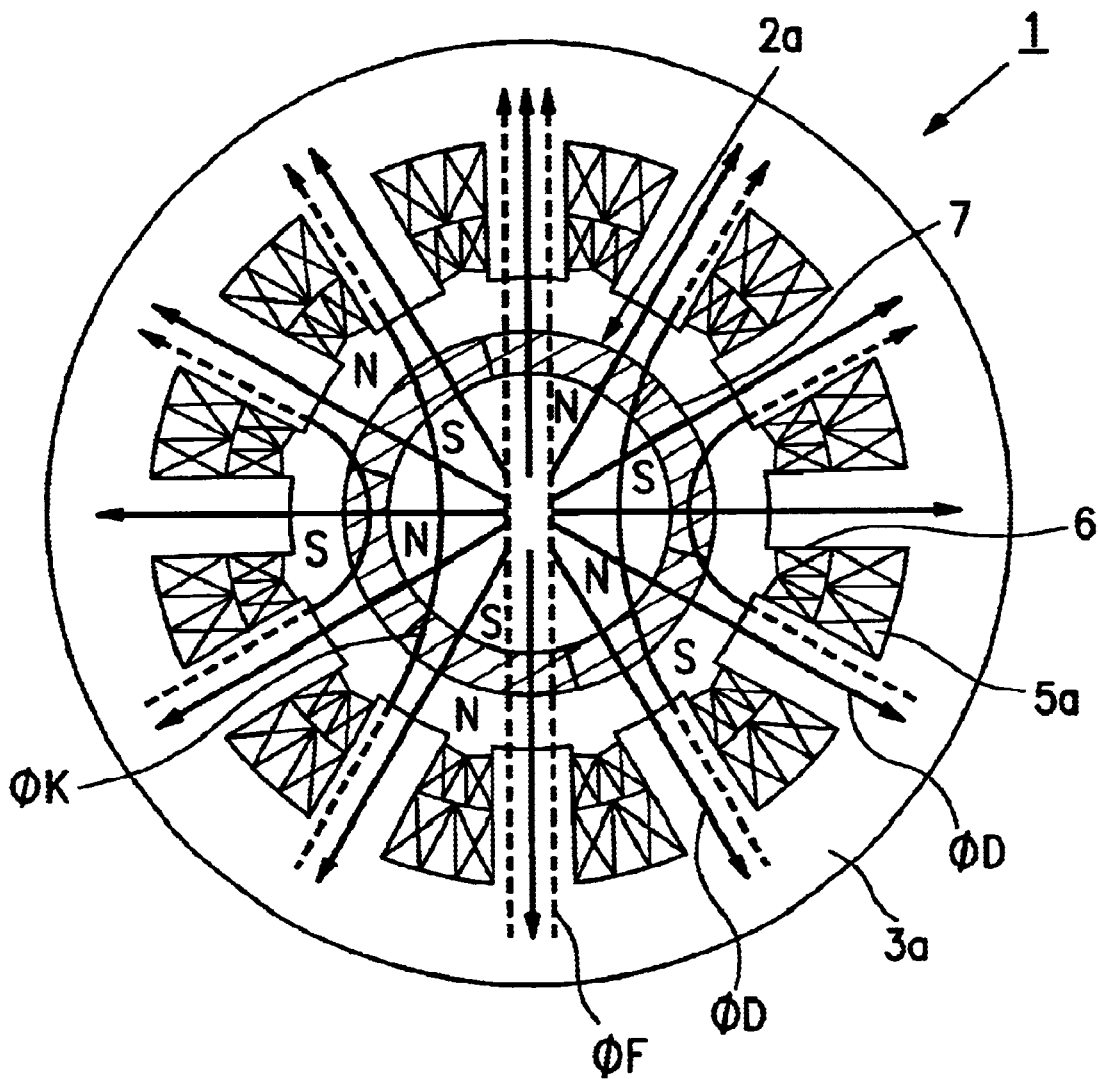
FIG. 13 shows a transverse cross section of a magnetic levitation motor section to describe the principle of levitation in a magnetic levitation motor.
Figure 14:
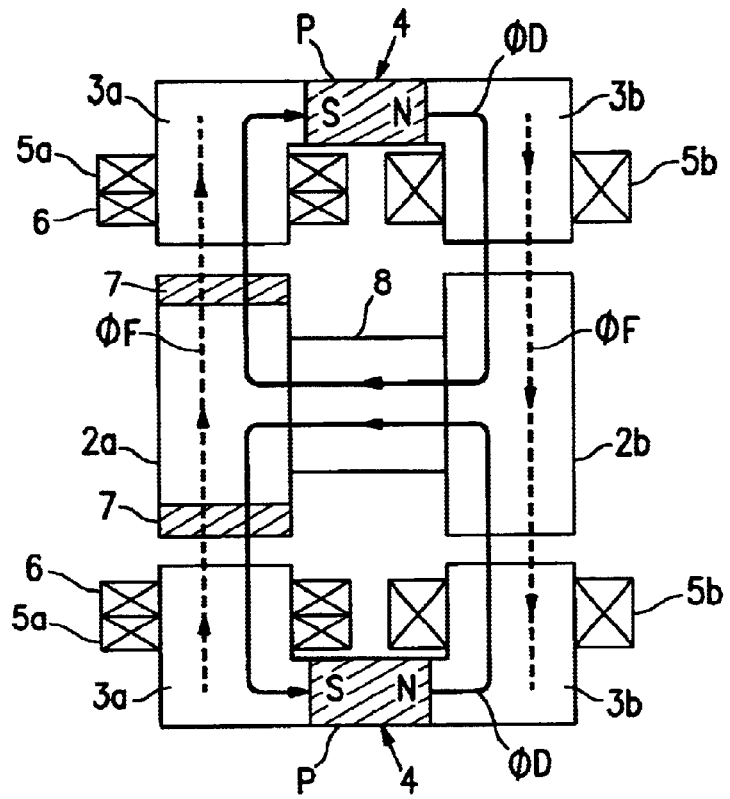

FIG. 14 schematically shows a vertical cross section of the magnetic levitation motor shown in FIG. 13.

Figure 15:
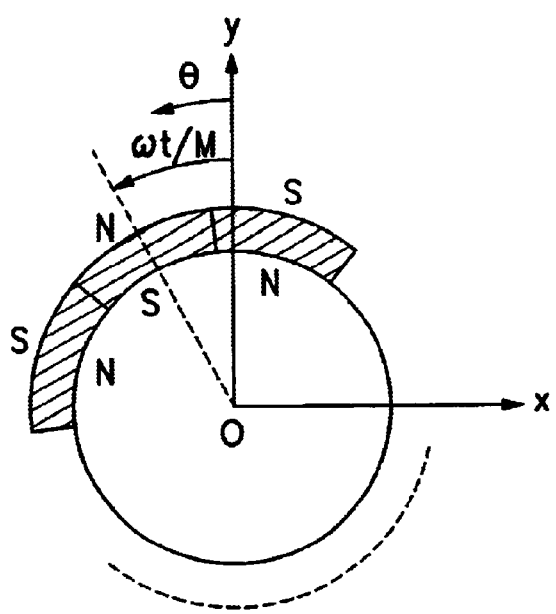

FIG. 15 shows an illustration of a system of coordinates of the magnetic levitation motor shown in FIG. 13.

Figure 16A:
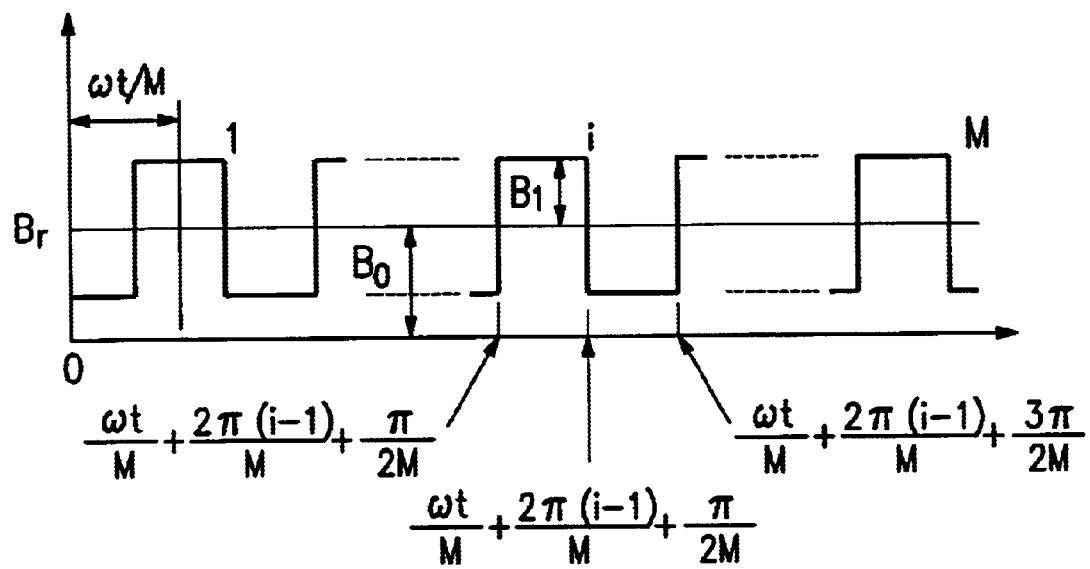

FIG. 16(a) shows the relation between time and magnetic flux density of a bias magnetic flux generated by permanent magnets of a rotor and a direct current magnetic field generation device.

Figure 16B:
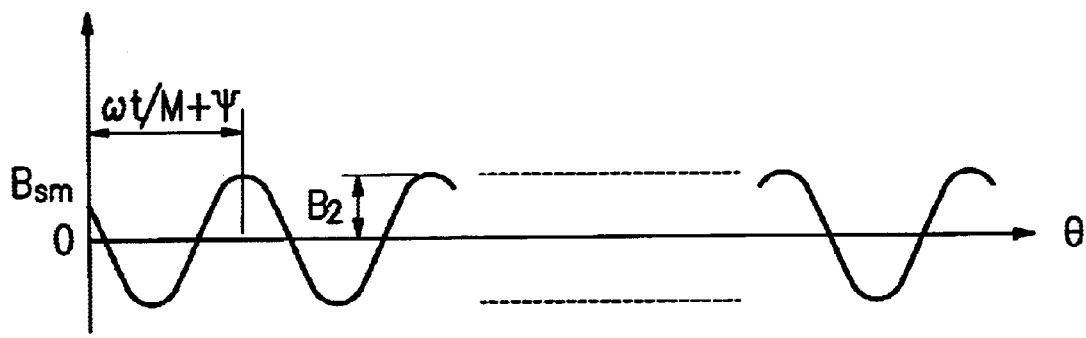

FIG. 16(b) shows the relation between time and magnetic flux density of a magnetic flux generated by a second stator winding between the stator and the rotor.

Figure 16C:
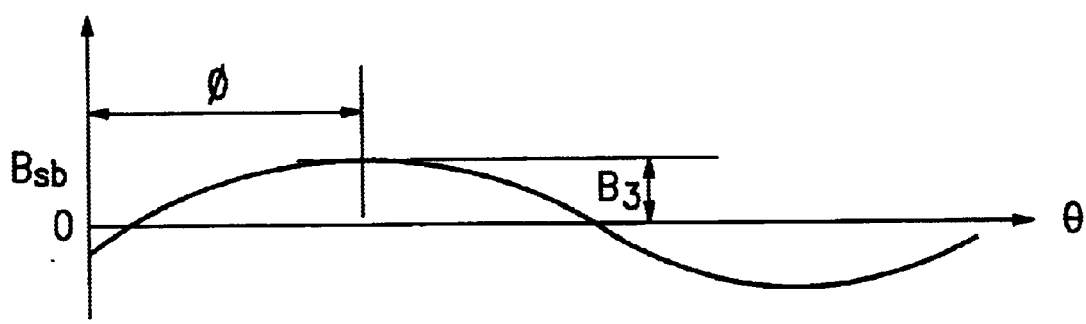

FIG. 16(c) shows the relation between time and magnetic flux density of a magnetic flux generated by a first stator winding.

DESCRIPTION OF PREFERRED EMBODIMENTS

Magnetic levitation motors in accordance with various embodiments of the present invention are described below with reference to the accompanying drawings.

FIGS. 13 and 14 show a magnetic levitation motor 1 having rotors 2a and 2b, stators 3a and 3b, a direct current magnetic field generation device 4, first stator windings 5a and 5b for controlled levitation, a second stator winding 6 for generating a rotation force, and a plurality of permanent magnets 7 provided on the rotors. A motor is formed between the rotor 2a equipped with the permanent magnet 7 and the stator 3a. Also, magnetic bearings are formed between the rotors 2a and 2b and the stators 3a and 3b, respectively.

The rotors 2a and 2b are composed of a magnetic material, and provided on a rotor shaft 8 of a magnetic material at locations spaced a specified distance from one another. Among the rotors 2a and 2b, the plural permanent magnets 7 are disposed around a peripheral surface of the rotor 2a in a manner that their magnetic polarities are alternately inverted (i.e., N, S, N, S, . . . ) along a direction of the periphery of the rotor 2a. The permanent magnets 7 include permanent magnets with N-polarities being exposed on their surfaces and permanent magnets with S-polarities being exposed on their surfaces that are alternately disposed. The rotors 2a and 2b may preferably be formed from stacked silicon steel plates in order to prevent eddy currents.

The stators 3a and 3b are disposed adjacent to external peripheral surface of the rotors 2a and 2b in a manner to encircle the peripheral surfaces of the rotors 2a and 2b, respectively. First stator windings 5a and 5b are wound around the stators 3a and 3b, respectively, to generate two pole levitation control magnetic fluxes $\phi F$ to controllably levitate the rotors 2a and 2b. A second stator winding 6 is provided on the stator 3a adjacent to the first stator winding 5a to provide a rotation magnetic field $\phi K$ for the rotor 2a.

The direct current magnetic field generation device 4 is provided between the stators 3a and 3b. The direct current magnetic field generation device 4 generates a magnetic flux $\phi D$ that is radially distributed and oriented from the rotors 2a and 2b to the stators 3a and 3b. In one embodiment, the direct current magnetic field generation device 4 is formed from permanent magnets P that are disposed in a central area between the stators 3a and 3b. The permanent magnets P generate direct current bias magnetic fields between the rotors 2a and 2b and the stators 3a and 3b. The number of the permanent magnets P that function as the direct current magnetic field generation device 4 for generating the bias magnetic fluxes is not particularly restricted. However, the greater the number of bias magnetic fluxes within the gap, the more the required levitation current is reduced. Accordingly, the number of the permanent magnets P may preferably be increased as many as possible. The stators 3a and 3b may also be formed from stacked silicon steel plates.

The number of the magnetic poles of the rotor 2a and the number of slots of the stator 3a are not particularly restricted. Any number of the magnetic poles or the slots may be acceptable to the extent that they can compose a PM motor. However, in a preferred embodiment, the number of the magnetic poles may be 6 or more, and the number of the slots may be 9 or more. In the embodiment shown in the figure, six (6) magnetic poles and twelve (12) slots are provided. In an alternative embodiment, the PM motor described above may have a stator with a slot-less structure.

Operations of the magnetic levitation motor will be described with reference to FIGS. 13 and 14 and FIGS. 15 and 16.

FIG. 15 shows a system of coordinates of the rotor. In FIG. 15, a rotation center of the stators 3a and 3b is defined at 0, a horizontal axis is defined as an x-axis and a vertical axis perpendicular to the x-axis is defined as a y-axis. When a rotary coordinate fixed on the stators 3a and 3b is $\theta$, the angular speed of the rotors 2a and 2b is $\omega$, and time is t, each of the stators 3a and 3b is disposed at an angular speed $\theta$ from the y-axis. When the y-axis is set at time t=0, the position of the rotors 2a and 2b after t seconds is obtained by a formula $\omega t/M$.

FIGS. 16(a)–16(c) show relations between magnetic fluxes of the stators and the rotors and time. FIG. 16(a) shows time-wise changes in the magnetic flux density Br of the bias magnetic flux generated by the permanent magnets of the rotors and the direct current magnetic field generation device. FIG. 16(b) shows time-wise changes in the magnetic flux density Bsm generated by the second stator winding in the gap between the stators and the rotors. FIG. 16(c) shows time-wise changes in the magnetic flux density Bsb generated by the first stator winding.

In the magnetic levitation motor 1, current is conducted through the first stator windings 5a and 5b for generating a levitation force so that magnetic fields are created by the first stator windings 5a and 5b in a manner shown in FIG. 16(c). Also, current is conducted through the second stator winding 6 for generating a rotation force so that magnetic fields are created by the second stator winding 6 in a manner shown in FIG. 16(b). As a result, the magnetic levitation motor 1 magnetically floats and rotates as a motor.

In this manner, current is conducted through the first stator windings 5a and 5b to generate the magnetic flux density Bsb, and current is conducted through the second stator winding 6 to generate the magnetic flux density Bam, to thereby create a magnetic levitation and a rotation independently from one another. The generation of independent magnetic levitation and rotation forces is logically analyzed. In order to make the logical analysis, the following assumptions (1) through (6) are made.

(1) Electric current is continuously distributed along the stators 3a and 3b.

(2) The motor is in a constant rotation and under a constant thrust load (the gravity and the like).

(3) The rotor 2a forms a magnetic flux density having a rectangular waveform by the permanent magnets, and this magnetic flux density does not cause an eccentric force.

(4) The center of the rotors 2a and 2b concurs with the center of the stators 3a and 3b without an eccentricity.

(5) The bias magnetic flux is constant and radially distributed.

(6) The current conducted through the second stator winding 6 for generating a rotation magnetic field does not cause any armature counter action.

Under the assumptions described above, the magnetic flux density Br by the bias magnetic flux generated by the rotor 2a and the permanent magnets 7 is given by Formula 1 as follows:

$$Br = \begin{bmatrix} B_0 + B_1 \ldots \left( \frac{\omega t}{M} + \frac{2\pi(i-1)}{M} - \frac{\pi}{2M} \sim \frac{\omega t}{M} + \frac{2\pi(i-1)}{M} + \frac{\pi}{2M} \right) \\ B_0 - B_1 \ldots \left( \frac{\omega t}{M} + \frac{2\pi(i-1)}{M} + \frac{\pi}{2M} \sim \frac{\omega t}{M} + \frac{2\pi(i-1)}{M} + \frac{\pi}{2M} \right) \end{bmatrix}$$ [Formula 1]

Where, $B_0$: Gap magnetic flux density by the bias magnets $B_1$: Wave height of the magnetic flux density by the permanent magnet of the rotor $B_2$: Wave height of the magnetic flux density by the motor winding $B_3$: Wave height of the magnetic flux density by a position control winding $\theta$: Rotary coordinate of the magnetic flux density by a position control winding $\psi$: Phase difference between the magnetic flux by the armature winding and the rotor $\phi$: Phase angle of the magnetic flux by the position control winding $\omega$: Angular speed of the rotor t: Time M: Pole pair number (=1, 2, 3, . . . )

i: Natural number

To simplify the calculation, the curve of the magnetic flux density Br is assimilated to a sine wave. As a result, the magnetic flux density Br can be presented by Formula 2 as follows:

$$Br = B_0 + B_1 \cos(M\theta - \omega t) \quad \text{[Formula 2]}$$

The magnetic flux density Bsm generated by the second stator winding 6 between the rotor 2a and the stator 3a is given by Formula 3 as follows:

$$Bms = B_2 \cos(M\theta - \omega t - \psi) \quad \text{[Formula 3]}$$

The magnetic flux density Bsb generated by the first stator windings 5a and 5b is given by Formula 4 as follows:

$$Bsb = B_3 \cos(\theta - \phi) \quad \text{[Formula 4]}$$

Therefore, the magnetic flux density Bg that is generated in air gaps between the rotors 2a and 2b and the stators 3a and 3b is given by Formula 5 as follows:

$$Bg = Br + Bsm + Bsb \quad \text{[Formula 5]}$$

When the radius of the rotors 2a and 2b is r, an air gap between the rotors 2a and 2b and the stators 3a and 3b is g, the axial length of each of the rotors 2a and 2b is l, and a minute angle is $d\theta$, a minute volume $\Delta V$ of the air gap is given by Formula 6 as follows:

$$\Delta V = rlgd\theta \quad \text{[Formula 6]}$$

Magnetic energy $\Delta W$ stored in the minute volume $\Delta V$ is given by Formula 7 as follows:

$$\Delta W = \frac{B_g^2}{2\mu_0} \Delta V = \frac{B_g^2}{2\mu_0} rlgd\theta \quad \text{[Formula 7]}$$

Accordingly, a radial force dF along the radial direction is given by Formula 8 below with a virtual displacement of the magnetic energy stored in the minute volume of the gap:

$$dF = \frac{\partial \Delta W}{\partial g} = \frac{B_g^2}{2\mu_0} rld\theta \quad \text{[Formula 8]}$$

Forces Fx and Fy generated along the x-axis and the y-axis are calculated by Formula 9 and Formula 10 presented below, respectively, by integrating an x-direction component and a y-direction component of the force dF in Formula 8 along the entire periphery of the gap for a given value of $\theta$.

$$\begin{aligned} Fx &= \int_V dF\cos\theta \\ &= \int_0^{2\pi} \frac{B_g^2}{2\mu_0} rl\cos\theta d\theta \\ &= \frac{lr}{2\mu_0} \Bigg[ \frac{B_0 B_1}{2} \int_0^{2\pi} \cos\{(M-1)\theta - \omega t\} d\theta + \\ &\quad \frac{B_0 B_1}{2} \int_0^{2\pi} \cos\{(M-1)\theta - (\omega t + \psi)\} d\theta + \\ &\quad 2B_0 B_3 \pi \cos\phi + \\ &\quad \frac{B_1 B_3}{2} \int_0^{2\pi} \cos\{(M-2)\theta - (\omega t - \phi)\} d\theta + \\ &\quad \frac{B_2 B_3}{2} \int_0^{2\pi} \cos\{(M-2)\theta - (\omega t + \psi) + \phi\} d\theta \Bigg] \end{aligned}$$ [Formula 9]

$$\begin{aligned} Fy &= \int_0^{2\pi} \frac{1}{2\mu_0} B_g^2 rl\sin\theta d\theta \\ &= \frac{lr}{2\mu_0} \Bigg[ \frac{B_0 B_1}{2} \int_0^{2\pi} \sin\{(1-M)\theta + \omega t\} d\theta + \\ &\quad \frac{B_0 B_1}{2} \int_0^{2\pi} \sin\{(1-M)\theta + (\omega t + \psi)\} d\theta + \\ &\quad 2B_0 B_3 \pi \sin\phi + \\ &\quad \frac{B_1 B_3}{2} \int_0^{2\pi} \sin\{(2-M)\theta + \omega t - \phi\} d\theta + \\ &\quad \frac{B_2 B_3}{2} \int_0^{2\pi} \cos\{(2-M)\theta + (\omega t + \psi) - \phi\} d\theta \Bigg] \end{aligned}$$ [Formula 10]

When $M \geq 3$, Fx and Fy are given by Formula 11 and Formula 12, respectively, as follows:

$$Fx = \frac{B_0 B_3 lr\pi}{\mu_0} \cos(\phi) \quad \text{[Formula 11]}$$

$$Fy = \frac{B_0 B_3 lr\pi}{\mu_0} \sin(\phi) \quad \text{[Formula 12]}$$

Accordingly, it is understood that, without regard to the rotation angle of the rotors 2a and 2b, a constant levitation force is obtained. The levitation force in the x-direction in Formula 11, the levitation force in the y-direction in Formula 12 and the magnetic flux density of the permanent magnet of the rotor 2a do not contain a member of the magnetic flux density by the second stator winding 6 for generating a rotation magnetic field. Accordingly, it is understood that the magnetic levitation force is not influenced by the rotation magnetic field that is formed by the second stator winding 6.

On the other hand, a rotation torque T is given by Formula 13 as follows:

$$T = \int_0^{2\pi} \frac{\theta \Delta W}{\partial \psi} \quad \text{[Formula 13]}$$

$$= \frac{rlg MB_1 B_2 \pi}{\mu_0} \sin M\psi +$$

$$\frac{rlg MB_1 B_2}{2\mu_0} \int_0^{2\pi} \sin\{(M-1)\theta - M(\omega t + \psi) + \phi\} d\theta$$

When M≧2, the rotation torque T is given by Formula 14 as follows:

$$T = \frac{rlg MB_1 B_2 \pi}{\mu_0} \sin M\psi \quad \text{[Formula 14]}$$

Accordingly, it is understand that the rotation torque T does not contain any member of the air gap magnetic flux density of the bias magnetic field generated by the direct current magnetic field generation device 4, or the magnetic flux density generated by the first stator windings 5a and 5b for generating the magnetic levitation force. Consequently, the rotation torque T is not influenced by the bias magnetic field or the levitation magnetic field.

The magnetic levitation motor described above so far is described and shown in the specification of Japanese Laid-open patent application HEI 10-355124 that is filed by the present applicant and has not yet been published. The magnetic levitation motor described above provides the following advantages:

(1) Since the magnetic bearing and the magnetic circuit of the motor are integrally formed, the overall size of the magnetic levitation motor becomes small, and the axial length can be shortened. As a result, the critical speed can be increased and a high speed rotation becomes possible.
(2) The magnetic levitation control is not affected by the load torque or the motor electric current, and a more stabilized levitation force can be attained.
(3) The magnetic levitation control is not performed by the rotation magnetic field, and therefore a coordinate conversion is not required and the control system is simplified.
(4) A homopolar type magnetic levitation motor needs at least 8 magnetic salient poles. However, the magnetic levitation motor in accordance with the embodiment described above can be formed with at least 6 magnetic poles, and therefore, the structure is simplified.
(5) Permanent magnets can be used as the direct current magnetic field generation device, and therefore electric power is not required to generate magnetic fields.

In accordance with another embodiment of the present invention, the hybrid magnetic levitation motor described above has permanent magnets of a modified structure. As a result, permanent magnets for generating a bias magnetic flux need not to be independently provided, the interference between the levitation force and the rotation force is further reduced, and the motor output is increased.

Figure 1:
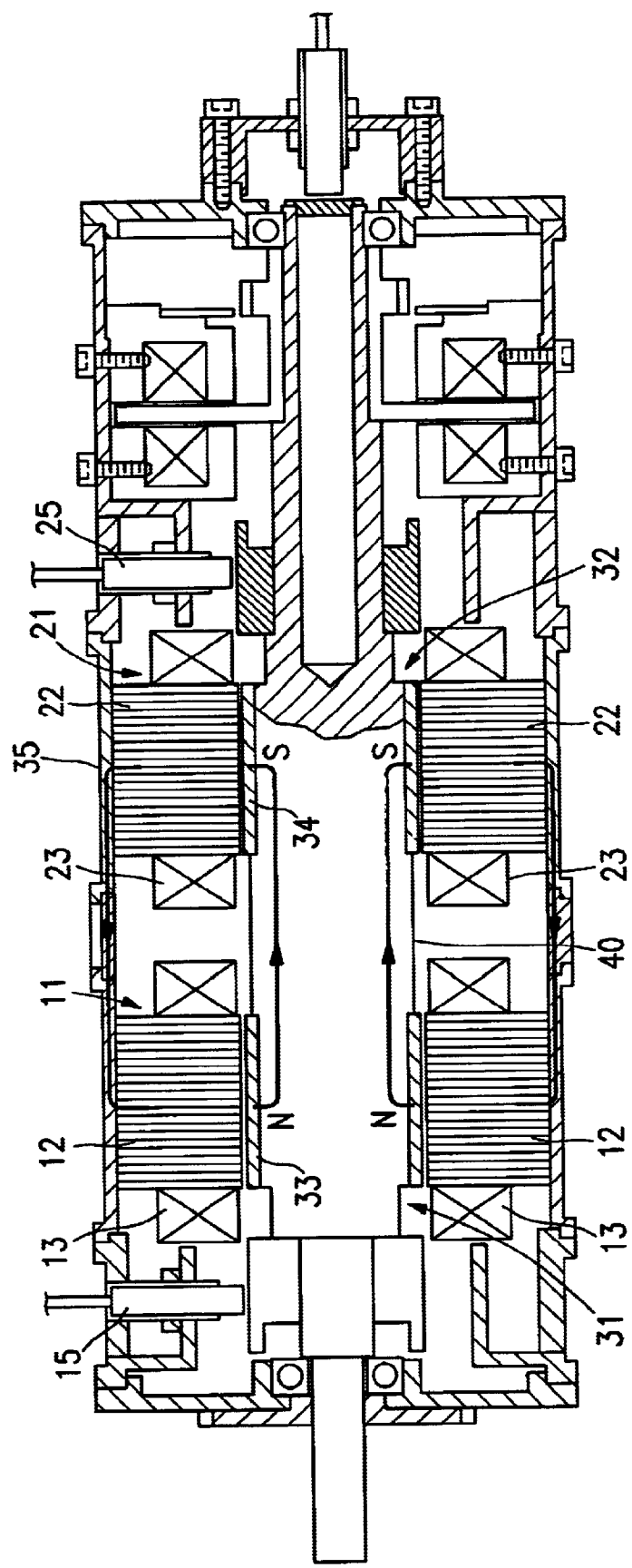
FIG. 1 shows a vertical cross section of a magnetic levitation motor in accordance with one embodiment of the present invention.

FIGS. 1 and 2 show a magnetic levitation motor in accordance with another embodiment of the present invention. The magnetic levitation motor shown in FIGS. 1 and 2 has a cylindrical motor case 35. Two magnetic levitation motor sections formed from two stator core sections 11 and 21 and two rotors 31 and 32 are disposed within the cylindrical motor case 35. The two stator core sections 11 and 21 have stator cores 12 and 22, and stator windings 13 and 23, respectively. The stator cores 12 and 22 may preferably be formed from stacked silicon steel plates. In the embodiment shown in FIG. 2, each of the stator cores 12 and 22 has twelve salient poles, and twelve divided cores affixed to an internal surface of the motor case 35.

A stator winding 13 and a stator winding 23 are wound around each of the salient poles of the stator cores 12 and 22, respectively. Each of the stator windings 13 and 23 includes a first stator winding (not shown) that generates a two-pole levitation control magnetic flux for controllably levitating each of the rotors 31 and 32, and a second stator winding (not shown) that generates a rotation magnetic field with respect to each of the rotors 31 and 32.

The two rotors 31 and 32 are disposed on a common rotator body 40 in the shape of a shaft at different locations in an axial direction of the common rotator body 40. The two rotors 31 and 32 form two magnetic levitation motor sections 11 and 21 disposed in the axial direction and spaced a distance from one another. The rotator body 40 that form each of the rotors 31 and 32 is formed from a magnetic material. Segmented-type permanent magnets 33 and 34 are affixed to external peripheral surfaces of the rotors 31 and 32, respectively. In the embodiment shown in FIG. 2, each of the segmented-type permanent magnets 33 and 34 is composed of four segments of permanent magnets divided from a cylindrical permanent magnet. The segmented permanent magnets 33 and 34 are disposed at equal intervals along the peripheral direction of the rotator body 40, and spaced a distance from the internal surfaces of the salient poles of the stator cores 12 and 22. The segmented permanent magnets 33 and 34 are disposed opposite to the internal surfaces of the salient poles of the stator cores 12 and 22.

The segmented permanent magnets 33 and 34 are fixed in the two magnetic levitation motor sections 11 and 21 in a manner to have mutually opposite magnetic polarities. In the embodiment shown in FIG. 1, surfaces of the segmented permanent magnets 33 that face to the stator core 12 have an S-pole and surfaces thereof that face to the rotator body 40 has an N-pole. On the other hand, surfaces of the segmented permanent magnets 34 that face to the stator core 22 have an N-pole and surfaces thereof that face to the rotator body 40 has an S-pole. Therefore, a magnetic flux that goes out from the internal periphery of the segmented permanent magnets 33 passes the rotator body 40 made of a magnetic material and enters the other segmented permanent magnets 34. A magnetic flux that goes out from the outer periphery of the segmented permanent magnets 34 passes the gap between the segmented permanent magnets 34 and the stator core 22 and enters the stator core 22, the motor case 35, the other stator core 12, the gap between the stator core 12 and the segmented permanent magnets 33, and returns to the segmented permanent magnets 33.

The two sets of segmented permanent magnets 33 and 34 work in association with the rotation magnetic fields generated by the second stator windings to thereby generate magnetic fluxes that create a rotation force to the rotors 31 and 32 in the same direction. Also, the two sets of segmented permanent magnets 33 and 34 function as bias magnets. In other words, the two sets of segmented permanent magnets 33 and 34 work in association with two-pole levitation control magnetic fluxes generated by the first stator windings to thereby generate direct current magnetic fields spreading in a radial direction of the rotors 31 and 32 for controllably levitating the rotors 31 and 32, respectively.

The rotation force and the levitation force are generated according to the same principles as those described with reference to FIGS. 13 through 16, and therefore, the description thereof is omitted.

As described above, the segmented permanent magnets 33 and 34 are affixed to the peripheral surfaces of the two rotors 31 and 32 in a manner to have mutually opposite magnetic polarities. The segmented permanent magnets 33 and 34 are therefore used to function as permanent magnets that generate a rotation force, and also to function as a direct current magnetic field generation device for levitating the rotors 31 and 32. In other words, permanent magnets that exclusively function as a direct current magnetic field generation device for generating levitation force are not required, in addition to the permanent magnets for generating a rotation force. As a result, the number of assembly steps is reduced, the size reduction becomes possible and the manufacturing cost can be lowered.

As shown in FIG. 1, gap sensors 15 and 25 are disposed on both sides of the two magnetic levitation motor sections 11 and 21. The gap sensors 15 and 25 are disposed opposite to detection members that are mounted integrally with the rotator body 40. Currents conducted through the first stator windings for generation of levitation force are controlled in a manner that gaps between the gap sensors 15 and 25 and the detection members, which are detected by the gap sensors 15 and 25, are constant. As a result, a rotation section including the rotator body 40 and the rotors 31 and 32 can be supported in a non-contact manner. It is noted that FIG. 1 illustrates that both end sections of the rotator body 40 appear to be supported by bearings. However, while the rotator body 40 is rotating, magnetic levitation forces are generated by conducting currents through the first stator windings for generating levitation force, and the currents are controlled, such that the rotator body 40 rotates without contacting the bearings.

In the embodiment shown in FIGS. 2(*a*) and 2(*b*), the segmented permanent magnets 33 and 34 that are affixed to the two rotors 31 and 32 are disposed at the same angular positions in the rotational direction. However, as shown in FIGS. 3(*a*) and 3(*b*), the segmented permanent magnets 33 and 34 that are affixed to the two rotors 31 and 32 may be disposed offset from one another in the rotational direction. For example, the segmented permanent magnets 33 and 34 may be disposed in a symmetrical positional relation. In this case, phases of the currents conducted through the first stator winding and the second stator winding need to be different from the embodiment shown in FIGS. 2(*a*) and 2(*b*), and are off set between the two rotors 31 and 32.

Figure 4A:
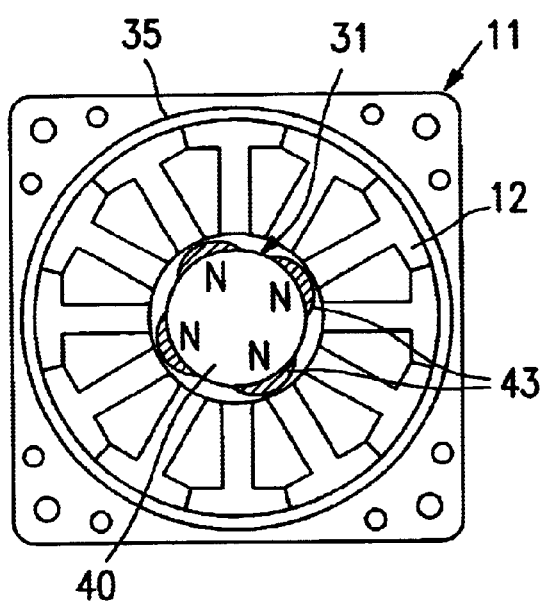
FIG. 4(a) shows a transverse cross section of a magnetic levitation motor section on one side of a magnetic levitation motor in accordance with another embodiment of the present invention.
Figure 4B:
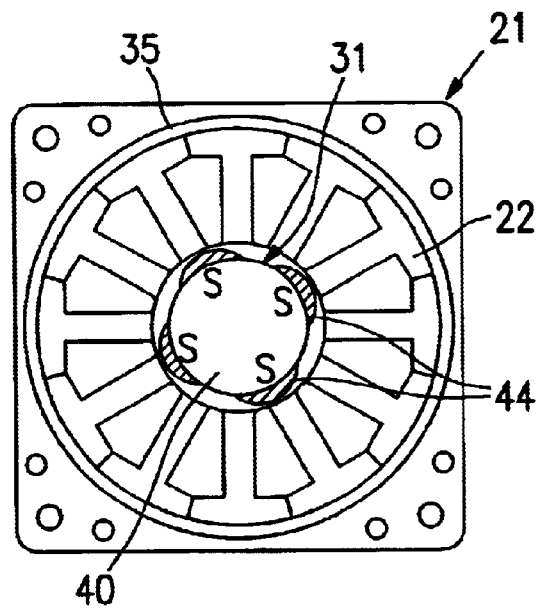
FIG. 4(b) shows a transverse cross section of a magnetic levitation motor section on the other side.
Figure 5A:
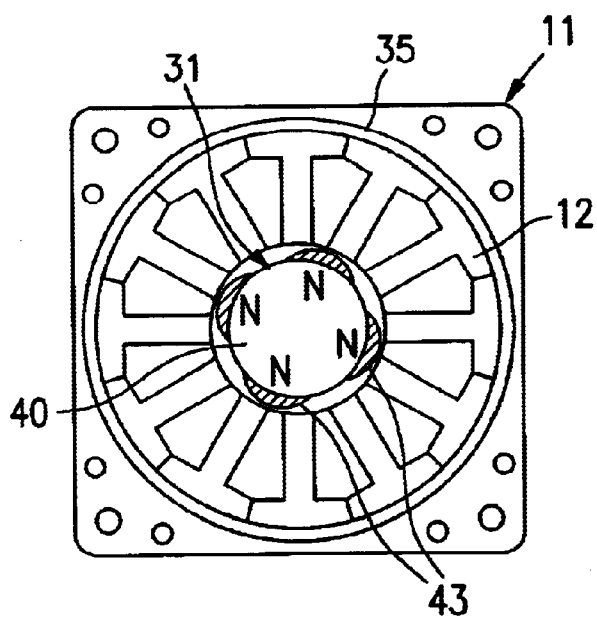
FIG. 5(a) shows a transverse cross section of a magnetic levitation motor section on one side of a magnetic levitation motor in accordance with another embodiment of the present invention.
Figure 5B:
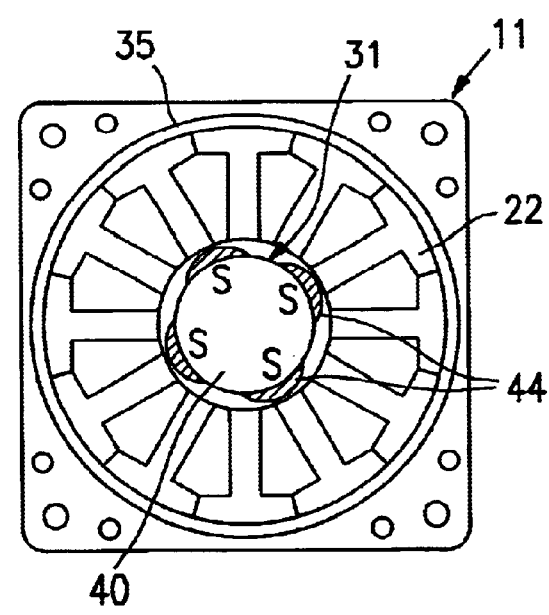
FIG. 5(b) shows a transverse cross section of a magnetic levitation motor section on the other side.

As described above, in order to reduce the interference between the levitation force and the rotation force as much as possible, preferably, changes of the gap magnetic flux density between the rotor and the stator core in the rotational direction may generally define a sine waveform. For this purpose, as shown in FIGS. 4 and 5, the face of each of the segmented permanent magnets 43 and 44 opposing to each of the stator cores 12 and 22 may preferably have an arcuate cross section perpendicular to the rotation axis, rather than a rectangular cross section of each of the segmented permanent magnets 33 and 34 shown in FIGS. 2 and 3. In one embodiment, each internal peripheral surface of each of the segmented permanent magnets 43 and 44 is closely adhered to the peripheral surface of the rotator body 40. Each external peripheral surface of each of the segmented permanent magnets 43 and 44, which faces each of the stator cores 12 and 22, is in an arc shape that continuously changes the gap distance between the external peripheral surface of each of the segmented permanent magnets 43 and 44 and each of the stator cores 12 and 22. In a preferred embodiment, each of the segmented permanent magnets 43 and 44 has a crescent-shape cross section as a whole as viewed in the axial direction. As a result, the magnetic flux density changes smoothly along the adjacent segmented permanent magnets, and the changes of the magnetic flux density generally define a sine waveform.

However, when the segmented permanent magnets 43 and 44 are provided with a crescent-shape cross section, as shown in FIGS. 4 and 5, a mean value of the gaps between the stator core and the segmented permanent magnets increases, and therefore the magnetic flux efficiency lowers. Accordingly, the magnitude of the interference between the levitation force and the rotation force, and the magnitude of the efficiency decrease are considered to provide each of the segmented permanent magnets 43 and 44 with a cross section that provides characteristics closest to the intended characteristics.

It is noted that FIGS. 4(*a*) and 4(*b*) correspond to FIGS. 2(*a*) and 2(*b*), respectively. In the embodiments shown in these figures, the two sets of segmented permanent magnets 43 and 44 are disposed at the same locations in the peripheral direction. FIGS. 5(*a*) and 5(*b*) correspond to FIGS. 3(*a*) and 5(*b*), respectively. In the embodiments shown in these figures, the segmented permanent magnets 43 and 44 are disposed off set from each other in the peripheral direction.

In the embodiments described above, two magnetic levitation motor sections that generate the rotation force and the levitation force are joined together in the axial direction. As a result, a larger motor output can be obtained, and a levitation force that is well balanced in the axial direction can be obtained.

The embodiments described above are also applicable to outer rotor type motor, and are not limited to the inner rotor type motors shown above.

Next, a magnetic levitation motor in accordance with another embodiment of the present invention will be described.

Figure 6:
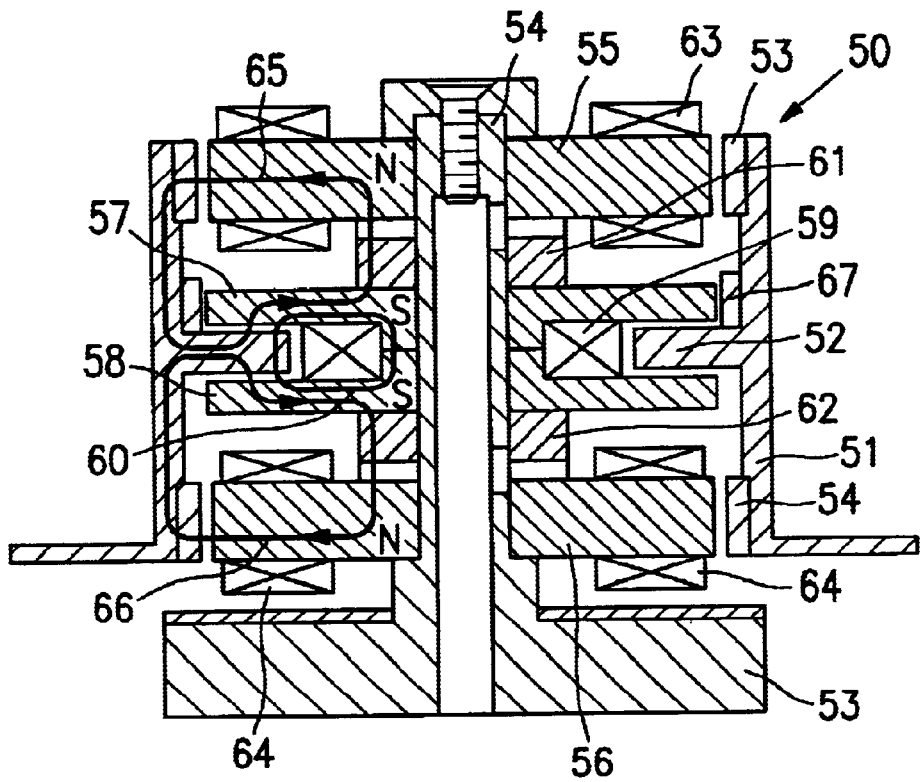
FIG. 6 shows a vertical cross section of a magnetic levitation motor in accordance with another embodiment of the present invention.

A magnetic levitation motor shown in FIG. 6 has a base 53 that defines a frame of the motor, and a shaft 54 that is integrally formed with the base 53 and extending upwardly. A stator core section 56, a bias magnet 62, tow yolks 58 and 57, a bias magnet 61 and a stator cores section 55 are mounted, in this order, on the shaft 54. The stator core section 56 abuts to a stepped section in the shaft 54. An appropriate clamp member that is fixed on the upper end of the shaft 54 presses down on the stator core section 55, to thereby fix the members described above on the shaft 54. Each of the yolks 58 and 57 has a cylindrical section that extends on its internal side in the axial direction. The cylindrical sections of the yolks 58 and 57 abut to each other, such that the two yolks 58 and 57 are separated from each other in the axial direction to define a space between the two yolks 58 and 57. A thrust control coil 59 is wound around the cylindrical sections of the two yolks 58 and 57 in the space.

Stator windings 63 and 64 are wound around the stator core sections 55 and 56, respectively. Each of the stator windings 63 and 64 is formed from a first stator winding and a second stator winding. The first stator winding generates a two-pole levitation control flux for controlling levitation of a rotor 50. The second stator winding generates a rotation magnetic field for the rotor 50. The rotor 50 is disposed about an external periphery of a stator that is formed from the stator cores 55 and 56, and the yolks 58 and 57. The rotor 50 includes a cylindrical rotor case 51 of a magnetic material. The rotor case 51 is disposed in a manner to encircle the stator. The rotor case 51 has an integrally formed flange-shaped yolk 52 at its central area in the axial direction. The flange-shaped yolk 52 inwardly extends from the rotor case 51. A rotor magnet 53 that is formed from a ring-shaped permanent magnet is attached to the internal surface of the rotor case 51 at an upper end thereof. A rotor magnet 54 that is formed from a ring-shaped permanent magnet is attached to the internal surface of the rotor case 51 at a lower end thereof. Also, a touch-down bearing 67 is attached to the internal surface of the rotor case 51 above the yolk 52.

The yolk 52 of the rotor case 51 is located in a space formed between the two yolks 58 and 57. The distance of the space in the axial direction is greater than the axial length of the yolk 52, such that the yolk 52 can rotate without contacting the yolks 58 and 57. The touch-down bearing 67 contacts the yolk 57 to support the rotor 50 when the rotor 50 is not rotating, in other words, when the magnetic levitation control is not conducted, or when the rotation of the rotor is started or stopped. Internal peripheral surfaces of the rotor magnets 53 and 54 are disposed opposing to and spaced an appropriate distance from the external surfaces of the stator core sections 55 and 56.

As a result, the bias magnets 61 and 62 are disposed on the internal surfaces between the stator core 55 and yolk 57 and between the yolk 58 and the stator core section 56. Each of the bias magnets 61 and 62 is formed in a ring shape, and magnetized in the axial direction. As a result, a bias magnetic flux 65, that successively circulates the bias magnet 61, the stator core section 55, the rotor magnet 53, the rotor case 51, the yolk 52, the yolk 57 and the bias magnet 61, is formed. Also, a bias magnetic flux 66, that successively circulates the bias magnet 62, the stator core section 56, the rotor magnet 54, the rotor case 51, the yolk 52, the yolk 58 and the bias magnet 62, is formed.

The bias magnetic fluxes 65 and 66 define magnetic paths for thrust bearings. Each of the bias magnetic fluxes 65 and 66 may be divided into a stator-side thrust bearing magnetic path section and a rotor-side thrust bearing magnetic path section. In the embodiment shown in FIG. 6, a rotor-side thrust bearing magnetic path section is interposed between two stator-side thrust bearing magnetic path sections. Gaps in the thrust direction are formed between the yolk 52 of the rotor case 51 and the yolk 57 of the stator, and between the yolk 52 and the yolk 58 of the stator. The bias magnetic fluxes 65 and 66 pass the gaps.

When a current is conducted through the thrust control coil 59, the coil 59 generates a magnetic flux. Depending on the direction of the current flowing through the coil 59, the magnetic flux generated by the coil 59 successively passes the yolk 57, the yolk 52 and the yolk 58, such that the magnetic flux passes the two gaps formed in the thrust direction. In the embodiment, the magnetic flux generated by the coil 59 is referred to as a thrust magnetic bearing control magnetic flux 60. Magnetic attraction forces are generated by the bias magnetic flux 65 and the bias magnetic flux 66 between the upper yolk 57 and the rotor-side yolk 52 and between the lower yolk 58 and the rotor-side yolk 52, and the magnetic attraction forces act on the rotor-side yolk 52. The magnetic attraction forces are controlled by conducting current through the thrust control coil 59 to thereby control the position of the rotor 50.

More specifically, a sensor device (not shown) detects the position of the rotor 50 in the axial direction. When the position of the rotor 50 in the axial direction moves to one side, the direction (i.e., normal or reverse direction) of a current that is conducted through the thrust control coil 59 and the magnitude of the current are controlled based on an output of the sensor. As a result, one of the bias magnetic fluxes 65 and 66 is strengthened and the other is weakened. Accordingly, one of the attraction forces for the yolk 52 is strengthened and the other is weakened to adjust the position of the rotor 50 in the axial direction to a predetermined position.

The stator core sections 55 and 56, the stator windings 63 and 64 and the rotor magnets 53 and 54 form a compound system of a radial magnetic bearing and a motor. Each of the stator windings 63 and 64 is formed from the first stator winding and the second stator winding, as described above. By controlling the current conducted through the first stator winding, an interaction between the bias magnetic fluxes 65 and 66 and the two-pole levitation control magnetic flux generated by the first stator winding is created to controllably levitate the rotor 50 in a non-contact manner in the radial direction. Also, by controlling the current conducted through the second stator winding, a rotation magnetic flux that works on the rotor 50 is generated to create an interaction between the rotation magnetic flux and the rotor magnets 53 and 54 to rotate the rotor 50.

As described above, in the embodiment shown in FIG. 6, a compound system of a radial magnetic bearing and a motor has a rotor-side thrust bearing magnetic flux path section and two stator-side thrust bearing magnetic flux path sections that interpose the rotor-side thrust bearing magnetic flux path section. The bias magnetic fluxes 65 and 66 that form a levitation control magnetic flux passes both of the gaps formed in the thrust direction between the rotor-side thrust bearing magnetic flux path section and the two stator-side thrust bearing magnetic flux path sections. Current is conducted through the thrust control coil 59 to support the thrust bearing load. As a result, a thrust magnetic bearing is also compounded in the compound system. Accordingly, the size of the motor is reduced, the axial length of the motor is shortened, and a higher rotation speed is achieved.

Also, in accordance with the embodiment described above, the stator core sections 55 and 56 are disposed along the axial direction in parallel with each other, and a rotor-side thrust bearing magnetic flux path section and two stator-side thrust bearing magnetic flux path sections are formed between the two stator core sections 55 and 56. This structure in effect provides two motor sections, in which one thrust magnetic bearing supports thrust loads of the two motor sections. As a result, a compact magnetic levitation motor that has a thrust magnetic bearing, and yet provides a large output.

Furthermore, since the stator core sections 55 and 56 and the two stator-side thrust bearing magnetic flux path sections are disposed in parallel with each other in the axial direction, the controlling force in the thrust direction is relatively large, and therefore the control in the thrust direction is quickly and stably performed.

The embodiment shown in FIG. 6 is a 5-axis control system. In other words, the stator core sections 55 and 56 are disposed along the axial direction in parallel with each other, and positions of the rotor 50 in the X-Y directions are controlled at the stator core sections 55 and 56. Also, the thrust magnetic bearing section controls the position of the rotor 50 in the Z direction. In accordance with another embodiment, as shown in FIG. 7, a 3-axis control system may also be employed.

Figure 7:
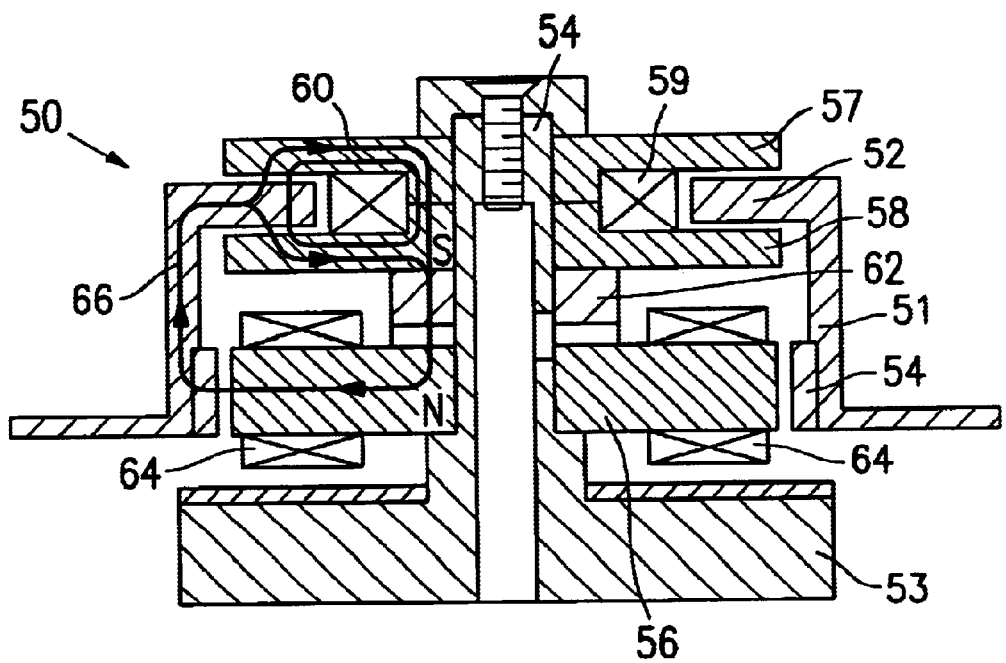
FIG. 7 shows a vertical cross section of a magnetic levitation motor in accordance with another embodiment of the present invention.

In accordance with the embodiment shown in FIG. 7, an upper section above the bias magnet 61 of the embodiment shown in FIG. 6 is removed. More specifically, a stator includes a stator core section 56, a bias magnet 62, two yolks 57 and 58, a thrust control coil 59 and a stator winding 64. A rotor 50 has a rotor case 51 that defines a main body. The rotor case 51 has an integrally formed flange-shaped yolk 52 at an upper end thereof. The yolk 52 extends inwardly in the radial direction. A rotor magnet 54 is attached to an inner peripheral wall of the rotor case 51. The members of the embodiment shown in FIG. 7 described above have a structure similar to the corresponding members of the embodiment shown in FIG. 6.

In the embodiment shown in FIG. 7, a bias magnetic flux 66, that successively circulates the bias magnet 62, the stator core section 56, the rotor magnet 54, the rotor case 51, the yolk 52, the yolks 58 and 57 and the bias magnet 62, is formed. The bias magnetic flux 66 defines a magnetic path for thrust bearing. The bias magnetic flux 66 may be divided into a stator-side thrust bearing magnetic path section and a rotor-side thrust bearing magnetic path section. Gaps in the thrust direction are formed between the yolk 52 of the rotor case 51 and the yolk 57 of the stator, and between the yolk 52 and the yolk 58 of the stator. The bias magnetic flux 66 bifurcates and passes both of the gaps.

When a current is conducted through the thrust control coil 59, the coil 59 generates magnetic fluxes, in a similar manner as the embodiment shown in FIG. 6. The magnetic flux generated by the coil 59 passes the two gaps formed in the thrust direction. The current conducted through the thrust control coil 59 is controlled in the same manner as the embodiment shown in FIG. 6, to thereby control the thrust magnetic bearing control magnetic flux 60. As a result, one of the bias magnetic fluxes in the gaps is strengthened, and the other is weakened to thereby strengthen one of the upper and lower attraction forces with respect to the yolk 52 and to weaken the other. In this manner, the rotor 50 is controlled in the axial direction to be positioned at a predetermined position. The stator core section 56, the stator winding 64 and the rotor magnet 54 form a radial magnetic bearing. Also, a rotation torque for rotating the rotor 50 is generated in the same manner as the embodiment shown in FIG. 6.

As a result, in accordance with the embodiment in FIG. 7, the position of the rotor 50 is controlled in the X-Y directions, which define a radial direction, by the stator core section 56, the stator winding 64 and the rotor magnets 54. Also, the thrust magnetic bearing section controls the position of the rotor 50 in the Z direction that defines a thrust direction. Accordingly, the embodiment shown in FIG. 7 forms a 3-axis control system. The embodiment shown in FIG. 7 provides the effects equivalent to those of the embodiment shown in FIG. 6.

Figure 8:
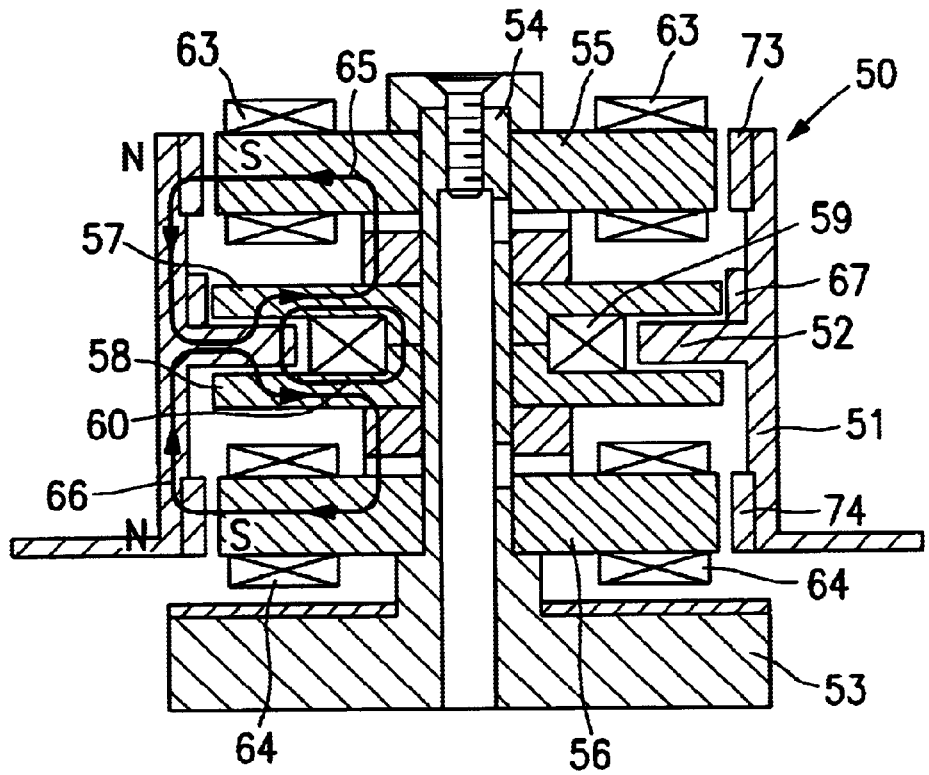
FIG. 8 shows a vertical cross section of a magnetic levitation motor in accordance with another embodiment of the present invention.
Figure 9:
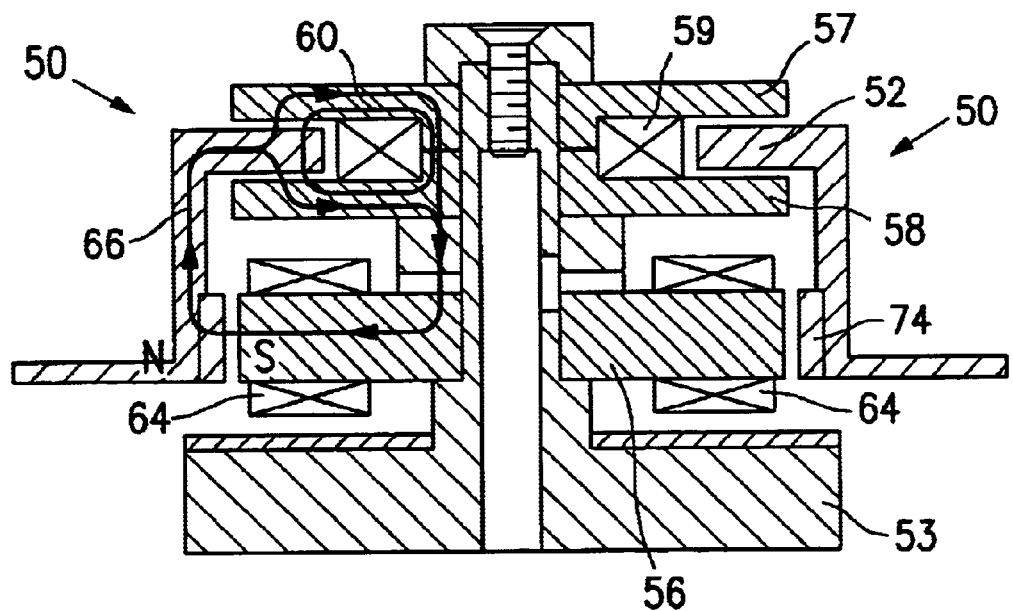
FIG. 9 shows a vertical cross section of a magnetic levitation motor in accordance with another embodiment of the present invention.

In the embodiments shown in FIG. 6 and FIG. 7, bias magnets are used to obtain a magnetic levitation force. However, the shape of the rotor magnets can be modified to eliminate the bias magnets, as shown in FIGS. 8 and 9. An embodiment shown in FIG. 8 corresponds to the embodiment shown in FIG. 6, and an embodiment shown in FIG. 9 corresponds to the embodiment shown in FIG. 7. In the embodiments shown in FIGS. 8 and 9, rotor magnets 73 and 74 that are attached to a rotor case 51 are not in a continuous ring shape, but in a segmented form. In other words, each of the rotor magnets 73 and 74 is composed of cylindrical magnet segments, which may be divided out of a cylindrical magnet. A plurality of segmented rotor magnets 73 and 74 are attached to the rotor case at specified intervals in the peripheral direction.

Each of the segmented rotor magnets 73 and 74 is magnetized in the thickness direction (i.e., the radial direction), and the magnetized polarity in the thickness direction is the same for both of the segmented rotor magnets 73 and 74. As a result, the rotor magnets 73 form a bias magnetic flux 65, that successively circulates through the magnet 73, the rotor case 51, the yolk 52, the yolk 57, the stator core section 55 and the magnet 73. Also, the rotor magnets 74 form a bias magnetic flux 66, that successively circulates through the magnet 74, the rotor case 51, the yolk 52, the yolk 58, the stator core section 56 and the magnet 74. As a consequence, the bias magnets 61 and 62 used in the embodiment shown in FIG. 6 are not required in the embodiment of FIG. 8. Members of magnetic material to form magnetic paths may be disposed in areas in which the bias magnets 61 and 62 are disposed. In this manner, the bias magnetic fluxes 65 and 66 pass through the two stator-side thrust bearing magnetic flux path sections and the rotor-side thrust bearing magnetic flux path section, in which the rotor-side thrust bearing magnetic flux path section is interposed between the two stator-side thrust bearing magnetic flux path sections.

The current conducted through the thrust control coil 59 is controlled to thereby generate the thrust magnetic bearing control magnetic flux 60. One of the magnetic attraction forces with respect to the yolk 52 on the rotor, which are generated by the bias magnetic fluxes 65 and 66, is strengthened, and the other is weakened, such that the axial position of the rotor 50 is controlled to be at a predetermined position. In a similar manner as the embodiment shown in FIG. 6, each of the stator windings 63 and 64 is formed from a first stator winding and a second stator winding. Current is controllably conducted through the first stator windings to create an interaction of the bias magnetic fluxes 65 and 66 to thereby controllably levitate the rotor in the radial direction. Also, current is controllably conducted through the second stator windings depending on the rotary position of the rotor to rotate the rotor 50.

The embodiment shown in FIG. 8 provides effects similar to those of the embodiment shown in FIG. 6. Also, the embodiment shown in FIG. 8 provides a further advantage in that independent bias magnets are not required. The embodiment shown in FIG. 8 provides a 5-axis control system in a similar manner as provided by the embodiment shown in FIG. 6.

In accordance with the embodiment shown in FIG. 9, a lower section below the yolk 57 of the embodiment shown in FIG. 8 substantially remains unchanged and an upper section above the yolk 57 is removed. In accordance with the embodiment shown in FIG. 9, a bias magnetic flux 66, that successively circulates through the magnet 74, the rotor case 51, the yolk 52, the yolk 58, the yolk 57, the stator core section 56 and the magnet 74, is formed. The bias magnetic flux 66 and the thrust magnetic bearing control magnetic flux 60 controls the position of the rotor 50 in the thrust direction. Also, currents conducted through the first and second stator windings are controlled, to thereby controllably levitate the rotor in the radial direction and to rotate the rotor 50.

The embodiment shown in FIG. 9 provides effects similar to those of the embodiment shown in FIG. 7. Also, the embodiment shown in FIG. 9 provides a further advantage in that independent bias magnets are not required. The embodiment shown in FIG. 9 provides a 3-axis control system in a similar manner as provided by the embodiment shown in FIG. 7.

Figure 10A:
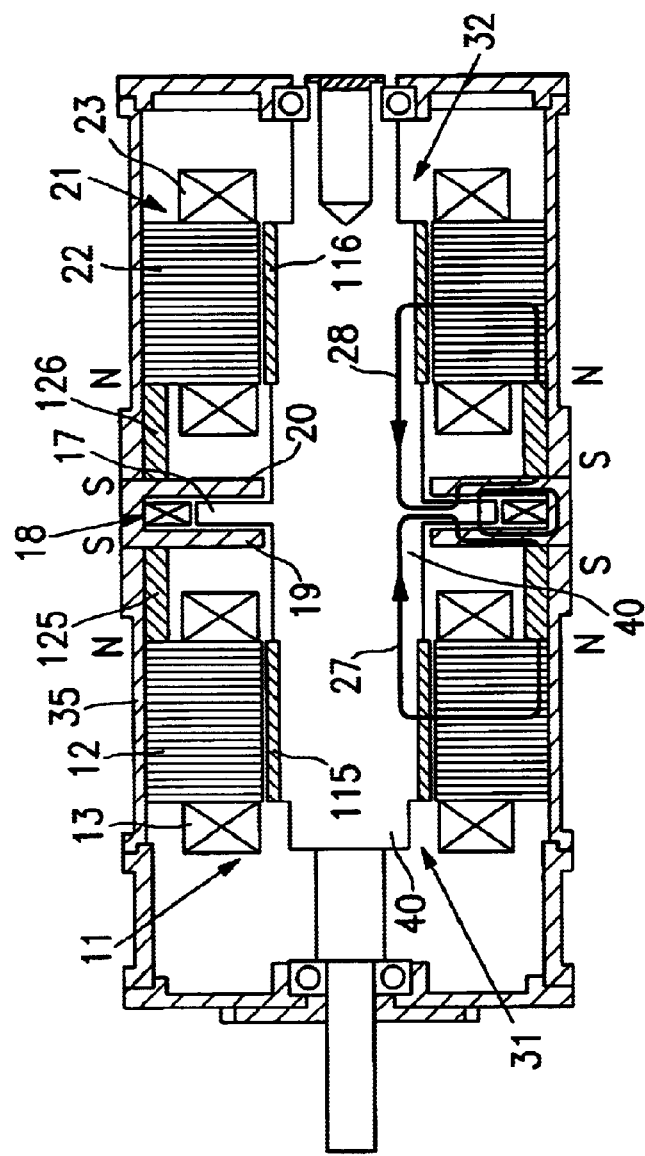
FIG. 10(a) shows a transverse cross section of a magnetic levitation motor in accordance with another embodiment of the present invention, and FIG. 10 (b) shows a vertical cross section thereof.
Figure 10B:
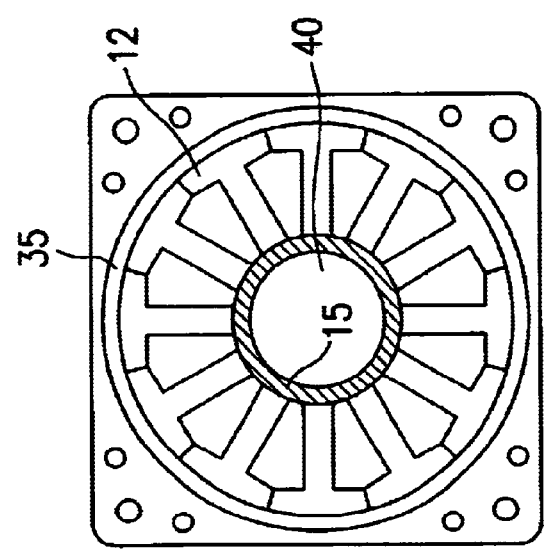
Figure 11A:
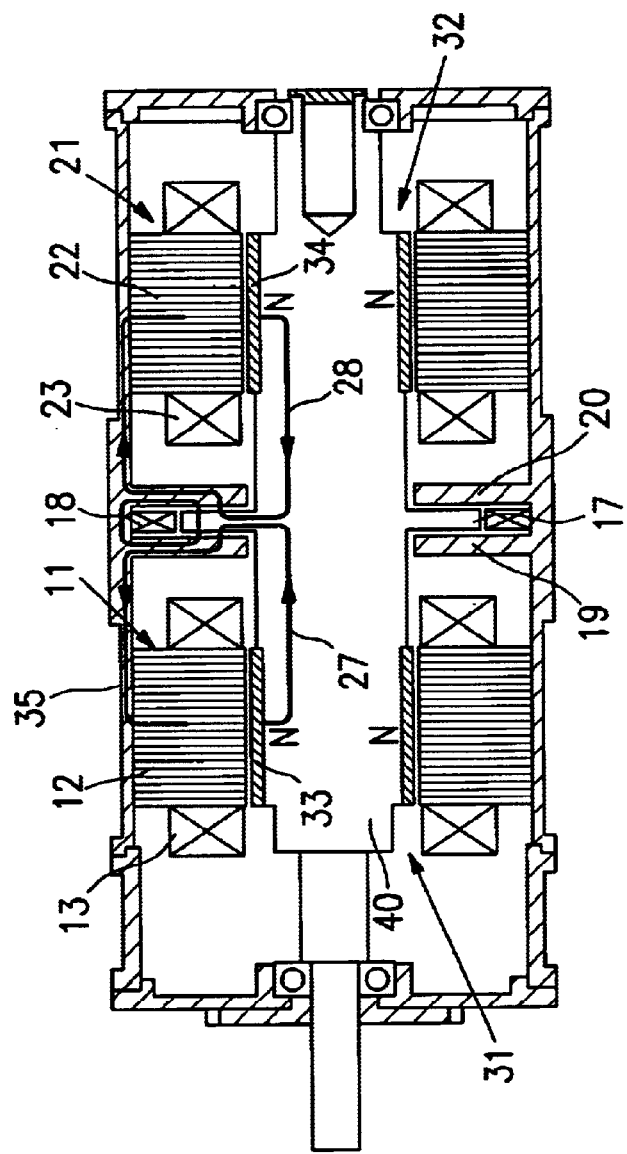
FIG. 11(a) shows a transverse cross section of a magnetic levitation motor in accordance with another embodiment of the present invention.
Figure 11B:
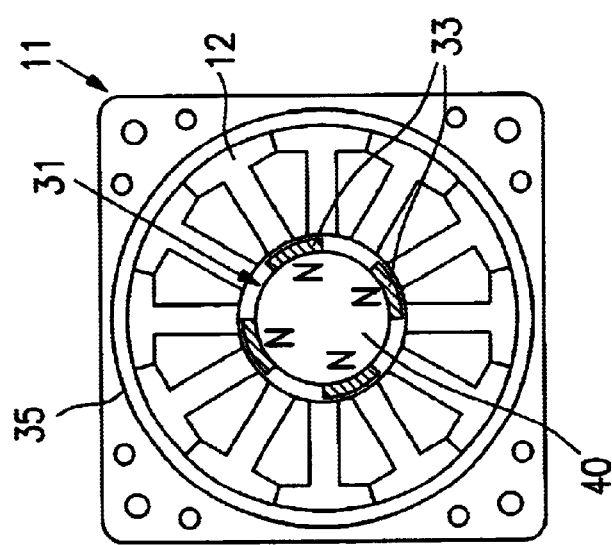
FIG. 11(b) shows a vertical cross section thereof.
Figure 12A:
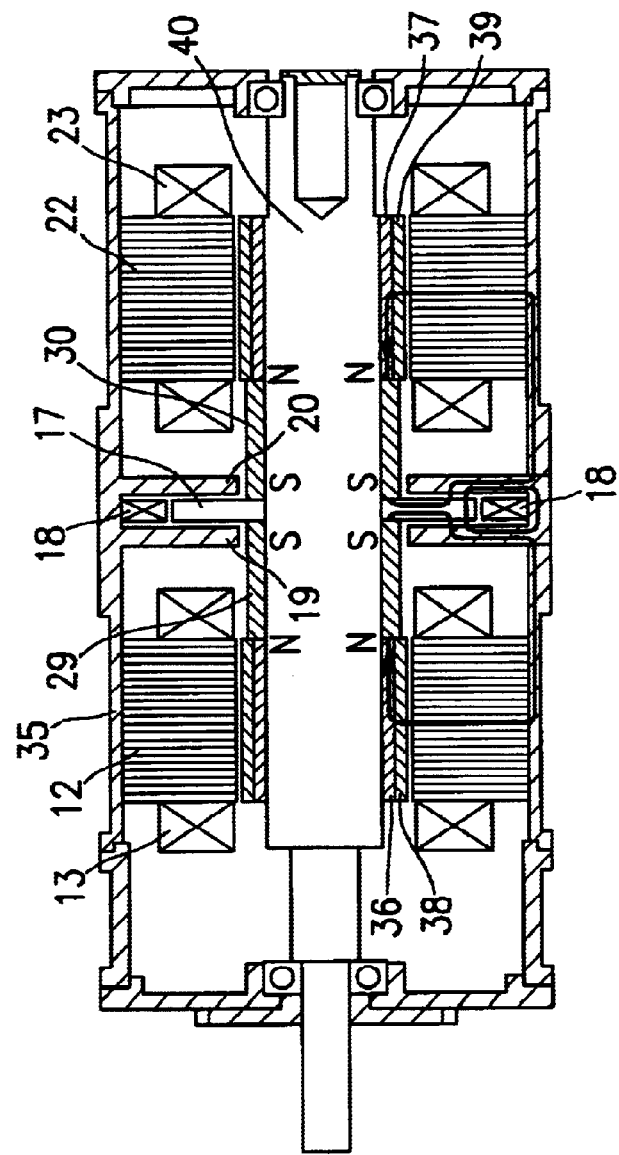
FIG. 12(a) shows a transverse cross section of a magnetic levitation motor in accordance with another embodiment of the present invention.
Figure 12B:
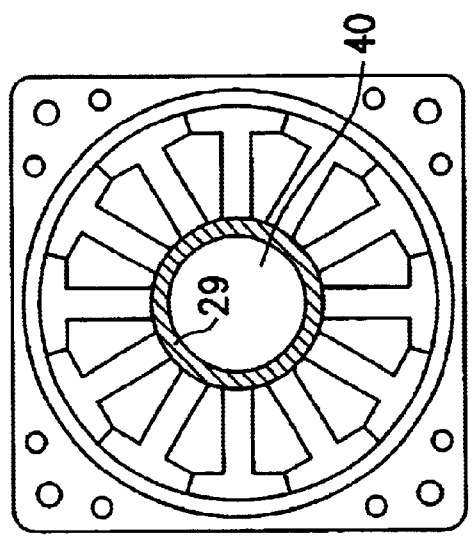
FIG. 12(b) shows a vertical cross section thereof.

The embodiments described above are outer-rotor types. The present invention is also applicable to inner-rotor type magnetic levitation motors, as shown in FIGS. 10 through 12. An inner-rotor type motor has a rotor disposed within a stator, and operates under the same principle as that of an outer-rotor type motor.

In accordance with an embodiment shown in FIG. 10, a stator core section and two stator-side thrust bearing magnetic flux path sections are disposed in parallel with one another in the axial direction, which corresponds to the embodiment shown in FIG. 6. Referring to FIG. 10, a magnetic levitation motor has a cylindrical motor case 35. Two magnetic levitation motor sections, which are formed from two stator core sections 11 and 21 and two rotors 31 and 32, are disposed on the interior of the cylindrical motor case 35. The two stator core sections 11 and 21 have stator cores 12 and 22 and stator windings 13 and 23, respectively. Each of the stator cores 12 and 22 is formed from a core of stacked layers having the same structure, and may preferably be formed from stacked silicon steel plates.

A stator winding 13 or a stator winding 23 is wound around each of the salient poles of each of the stator cores 12 and 22. Each of the stator windings 13 and 23 includes a first stator winding (not shown) that generates a two-pole levitation control magnetic flux for controllably levitating each of the rotors 31 and 32, and a second stator winding (not shown) that generates a rotation magnetic field with respect to each of the rotors 31 and 32.

The two rotors 31 and 32 are formed from a magnetic material, and disposed on a common rotator body 40 in the shape of a shaft at different locations in an axial direction. The two rotors 31 and 32 form two magnetic levitation motor sections 11 and 21 disposed separated from one another in the axial direction. The rotator body 40 that form each of the rotors 31 and 32 is formed from a magnetic material. Rotor magnets 115 and 116 that are formed form ring-shaped permanent magnets are affixed to external peripheral surfaces of the rotors 31 and 32, respectively. The rotor magnets 115 and 116 are disposed opposite to and spaced a distance from the internal surfaces of the salient poles of the stator cores 12 and 22.

The rotator body 40 has an integrally formed flange-shaped yolk 17 that extends outwardly in the radial direction at a central section along the axial direction of the rotator body 40. Two yolks 19 and 20, that interpose the yolk 17 in the axial direction, are affixed to the stator side. The yolks 19 and 20 are formed in one piece by an appropriate method such as a press-forming method, and has a U-shaped cross section. The yolks 19 and 20 are generally formed in a ring shape. An external peripheral section of the yolks 19 and 20 is affixed to the motor case 35. A thrust control coil 18 is provided between the yolks 19 and 20 about a peripheral side of the yolk 17 of the rotator body 40. Appropriate gaps are provided between the yolk 17 of the rotator body 40 and the yolks 19 and 20, and between the yolk 17 and the thrust control coil 18. Bias magnets 125 and 126 are disposed between the yolk 19 and the stator core 12 and between the yolk 20 and the stator core 22. The bias magnets 125 and 126 are in a ring shape and are attached to the internal surface of the motor case 35.

The two bias magnets 125 and 126 are magnetized in a width direction, i.e., an axial direction, as shown in FIG. 10. Directions of the magnetization of the bias magnets 125 and 126 are opposite to each other in the axial direction. Therefore, surfaces of the magnets 125 and 126 that are in contact with the yolks 19 and 20 are in the same magnetic polarity. As a result, a bias magnetic flux 27, that successively circulates through the bias magnet 125, the stator core section 12, the rotor magnet 115, the rotator body 40, the yolk 17, the yolk 18 and the bias magnet 125, is formed. Also, a bias magnetic flux 27, that successively circulates through the bias magnet 126, the stator core section 22, the rotor magnet 116, the rotator body 40, the yolk 17, the yolk 20 and the bias magnet 126, is formed.

The bias magnetic fluxes 27 and 28 define magnetic paths for thrust bearings. Each of the bias magnetic fluxes 27 and 28 may be divided into a stator-side thrust bearing magnetic path section and a rotor-side thrust bearing magnetic path section. In the embodiment shown in FIG. 10, a rotor-side thrust bearing magnetic path section is interposed between two stator-side thrust bearing magnetic path sections. Gaps in the thrust direction are formed between the yolk 52 of the rotator body 40 and the yolk 19 of the stator, and between the yolk 17 and the yolk 20 of the stator. The bias magnetic fluxes 27 and 28 pass the gaps, respectively.

When current is conducted through the thrust control coil 18, the coil 18 generates a magnetic flux. The magnetic flux generated by the coil 18 successively circulates through the yolk 19, the yolk 17 and the yolk 20, such that the magnetic flux passes the two gaps formed in the thrust direction. Magnetic attraction forces are generated by the bias magnetic flux 27 and the bias magnetic flux 28 between one of the yolks 19 and the other yolk 20, such that the magnetic attraction forces act on the rotor-side yolk 17 on the rotator body 40. The direction of current conducted through the thrust control coil 18 is controlled to control the magnetic attraction forces to thereby control the position of the rotator body 40, in other words, the position of the rotor in the thrust direction.

The principle of controlling the position of the rotator body 40 in the thrust direction is the same as the embodiment described with reference to FIG. 6. Also, in accordance with the embodiment shown in FIG. 10, the position control in the radial direction is achieved and the rotation torque is generated under the same principle as that of the embodiment shown in FIG. 6. Accordingly, the same effects attained by the embodiment shown in FIG. 6 are obtained.

FIG. 11 shows a magnetic levitation motor in accordance with another embodiment of the present invention, which is substantially the same as the embodiment shown in FIG. 8 except that it is an inner-rotor type. More specifically, the magnetic levitation motor shown in FIG. 11 has two rotor sections 31 and 32. Two sets of segmented rotor magnets 33 and 34 are provided on the two rotor sections 31 and 32. More specifically, a plurality of the segmented rotor magnets 33 and a plurality of the segmented rotor magnets 34 are attached to the rotor sections 31 and 32, respectively, at specified intervals in the peripheral direction.

Each of the segmented rotor magnets 33 and 34 is magnetized in the thickness direction (i.e., the radial direction), and the magnetized polarity in the thickness direction is the same for both of the segmented rotor magnets 33 and 34. As a result, the magnetic fluxes of the rotor magnets 33 and 34 have magnetic flux paths that are substantially the same as the magnetic flux paths shown in FIG. 10, and therefore bias magnetic fluxes 27 and 28 are formed. Accordingly, the embodiment shown in FIG. 11 does not require bias magnets, and the bias magnetic fluxes 27 and 28 pass the motor case 35 instead of bias magnets.

Current is controllably conducted through the thrust control coil 18 to control the position of the rotor in the thrust direction, in other words, to position the rotor at a predetermined location in the thrust direction. Each of the stator windings 13 and 23 is formed from a first stator winding for levitation control and a second stator winding for rotation control. Current is controllably conducted through the first stator windings for levitation control to thereby cause an interaction between the bias magnetic fluxes 27 and 28 to controllably levitate the rotor in the radial direction. Current is controllably conducted through the second stator windings for rotation control to thereby rotate the rotor.

FIG. 12 shows a variation of a type having bias magnets in accordance with one embodiment. The embodiment shown in FIG. 12 is similar to the one shown in FIG. 10. However, cylindrical bias magnets 29 and 30 are attached to the rotor side, but not to the stator side. More specifically, the cylindrical bias magnets 29 and 30 are attached to an external peripheral surface of the rotator body 40 in a manner to sandwich the yolk 17. The rotator body 40 is made of a magnetic material. Two rotor sections including the rotator 40 have rings 36 and 37 made of a magnetic material that are shrink-fitted about the external peripheral surface of the rotator body 40, and cylindrical rotor magnets 38 and 39 firmly attached to the external peripheral surfaces of the rings 36 and 37, respectively.

In the embodiment shown in FIG. 12, a bias magnetic flux, that successively circulates through the bias magnet 29, the ring 36, the rotor magnet 38, the stator core section 12, the motor case 35, the yolk 19, the yolk 17 of the rotator body 40, and the bias magnet 29, is formed. Also, a bias magnetic flux, that successively circulates through the bias magnet 30, the ring 37, the rotor magnet 39, the stator core section 22, the motor case 35, the yolk 20, the yolk 17 of the rotator body 40, and the bias magnet 30, is formed. The bias magnetic fluxes define magnetic paths for thrust bearings. Each of the bias magnetic fluxes may be divided into a stator-side thrust bearing magnetic path section and a rotor-side thrust bearing magnetic path section. The direction and other factors of current conducted through the thrust control coil 18 are controlled, such that the rotor can maintain a predetermined position in the thrust direction.

Also, currents conducted through the first stator windings among the stator windings are controlled to controllably levitate and support the rotor in the radial direction. Also, currents conducted through the second stator windings are controlled to rotate the rotor.

As described above, a magnetic levitation motor has a rotator body formed from a magnetic member and having segmented permanent magnets attached to a peripheral surface thereof. Two magnetic levitation motor sections are disposed in an axial direction of the rotator body. Each of the magnetic levitation motor sections having a first stator winding that generates a levitation control magnetic flux for levitating the rotator body and a second stator winding that generates a rotation magnetic flux for rotating the rotator body. The segmented permanent magnets are affixed to the rotator body at the two magnetic levitation motor sections with magnetic polarities thereof mutually opposite to each other. The segmented permanent magnets function as bias magnets that generate a direct-current magnetic flux that radially spreads from within the rotor.

As a result, the segmented permanent magnets function as permanent magnets for generating a rotation force and magnets for generating a levitation force. Accordingly, the structure is simplified and reduced in size and the cost is reduced.

In one aspect of the present invention, the two rotors forming the two magnetic levitation motor sections are respectively formed from the segmented permanent magnets mounted on a common rotation member of a magnetic material at different locations in an axial direction of the common rotation member. Furthermore, the two magnetic levitation motor sections include two stator cores that have an identical structure, and the first stator wiring and the second wiring is wound around each of the two stator cores. As a result, the motor output can be increased, and the levitation force that is well balanced in the axial direction is obtained.

In one aspect of the present invention, surfaces of the segmented permanent magnets facing one of the stator cores have an N-pole and surfaces of the segmented permanent magnets facing the other of the stator cores have an S-pole. As a result, the segmented permanent magnets can function as both of permanent magnets for generating a rotation force and permanent magnets for generating a levitation force. As a consequence, the structure is simplified.

In one aspect of the present invention, opposing surfaces of the segmented permanent magnets that face the stator cores have an arc shape to make a gap magnetic flux density to have generally a sine waveform. As a result, mutual interference between the levitation force and the rotation force can be reduced, and the levitation force and the rotation force can be efficiently obtained.

Also, in one aspect of the present invention, the magnetic levitation motor has detection sections that are integrally mounted on the common rotation member at locations that interpose the two magnetic levitation motor sections, and gap sensors opposing to the detecting sections. Current to the first stator winding for generating a levitation force is controlled such that gaps with respect to the detection sections detected by the gap sensors are constant. As a result, the rotation member, and the rotating parts including the rotor can be supported in a non-contact manner.

Furthermore, in accordance with another aspect of the present invention, a magnetic levitation motor having a compound structure of a radial magnetic bearing and a motor includes a rotor-side thrust bearing magnetic path section, and two stator-side thrust bearing magnetic path sections formed in a manner to interpose the rotor-side thrust bearing magnetic path section. Bias magnetic fluxes for forming levitation control magnetic fluxes pass both of the gaps formed in a thrust direction between the rotor-side thrust bearing magnetic path section and the two stator-side thrust bearing magnetic path sections. A thrust control coil is provided between the two stator-side thrust bearing magnetic path sections, and current is controllably conducted through the thrust control coil to support a thrust bearing load.

With the structure described above, a thrust magnetic bearing can also be compounded into the compound structure, the size of magnetic levitation motors can be further reduced. As a result, the axial length of magnetic levitation motors can be shortened, and a higher rotation speed can be achieved.

The stator core section comprises two stator core sections arranged in the axial direction, and the rotor-side thrust bearing magnetic path section and the two stator-side thrust bearing magnetic path sections are formed between the two stator core sections. As a result, in effect, two motor sections are provided in the motor, and thrust loads of the two motor sections are supported by one thrust magnetic bearing. As a consequence, there is provided a relatively compact magnetic levitation motor that has a thrust magnetic bearing, and yet generate a large output.

Also, when the stator core sections and the two stator-side thrust bearing magnetic flux path section are disposed in the axial direction, the control force in the thrust direction is substantially large, and therefore the control in the thrust direction can be quickly and stably conducted.

Also, in accordance with one aspect the present invention, segmented rotor magnets for generating a rotation torque are disposed on the rotor side opposite to the stator core section, wherein the segmented rotor magnets also function as bias magnets for generating a bias magnetic flux. As a result, magnets for generating a rotation torque and magnets for generation a magnetic levitation force do not need to be independently provided, and therefore the structure of the motor is simplified.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A magnetic levitation motor comprising:

a rotator body formed from a magnetic common rotation member and having segmented permanent magnets attached to a peripheral surface thereof, wherein surfaces of the segmented permanent magnets face a stator; and two magnetic levitation motor sections disposed in an axial direction of the rotator body, each of the magnetic levitation motor sections having a first stator winding that generates a levitation control magnetic flux for levitating the rotator body and a second stator winding that generates a rotation magnetic flux for rotating the rotator body;

wherein the segmented permanent magnets are affixed to the rotator body at the two magnetic levitation motor sections;

wherein surfaces of the segmented permanent magnets affixed to the rotator body that face the stator at a first of the two magnetic levitation motor sections have exclusively a first magnetic polarity; and wherein surfaces of the segmented permanent magnets affixed to the rotator body that face the stator at a second of the two magnetic levitation motor sections have exclusively a second magnetic polarity opposite that of the first magnetic polarity.

2. A magnetic levitation motor according to claim 1, wherein the rotator body is formed from a common rotation member of a magnetic material, and further comprising:

two rotors formed by the segmented permanent magnets located at two different locations in an axial direction of the common rotation member to form part of the two magnetic levitation motor sections; and two identical stator cores at the two magnetic levitation motor sections, each of the two stator cores is wound by the first stator winding and the second stator winding.

3. A magnetic levitation motor according to claim 2, wherein opposing surfaces of the segmented permanent magnets that face the stator cores have an arcuate shape to make a gap magnetic flux density to have a generally sine waveform.

4. A magnetic levitation motor according to claim 3, wherein an internal surface of each of the segmented permanent magnets is closely adhered to the peripheral surface of the common rotation member, and an external surface of each of the segmented permanent magnets has a crescent shape to provide a gap that continuously changes with respect to an internal surface of the stator cores.

5. A magnetic levitation motor according to claim 1, further comprising detecting sections that are formed on the common rotation member on locations that interpose the two magnetic levitation motor sections and gap sensors opposing to the detecting sections, wherein a current to the first stator winding for generating a levitation force is controlled such that gaps between the gap sensors and the detecting sections detected by the gap sensors are constant.

6. A method for manufacturing a magnetic levitation motor, the method comprising the steps of:

providing a rotator body formed from a magnetic common rotation member;

providing two magnetic levitation motor sections in an axial direction of the rotator body, each of the magnetic levitation motor sections having a first stator winding that generates a levitation control magnetic flux for levitating the rotator body and a second stator winding that generates a rotation magnetic flux for rotating the rotator body; and providing two sets of segmented permanent magnets on the rotator body at the two magnetic levitation motor sections;

wherein surfaces of the segmented permanent magnets affixed to the rotator body that face the stator at a first of the two magnetic levitation motor sections have exclusively a first magnetic polarity; and wherein surfaces of the segmented permanent magnets affixed to the rotator body that face the stator at a second of the two magnetic levitation motor sections have exclusively a second magnetic polarity opposite that of the first magnetic polarity.

7. A method for manufacturing a magnetic levitation motor according to claim 6, further comprising the steps of:

forming two rotors at the two magnetic levitation motor sections from the segmented permanent magnets mounted on a common rotation member of a magnetic material at different locations in an axial direction of the common rotation member, and providing two stator cores having an identical structure at the two magnetic levitation motor sections, wherein the first stator winding and the second stator winding are wound around each of the two stator cores.

* * * * *